(12) United States Patent
Jin et al.

(10) Patent No.: US 12,481,011 B2
(45) Date of Patent: Nov. 25, 2025

(54) MAGNETIC RESONANCE IMAGING SYSTEM, COMPENSATION PARAMETER DETERMINING METHOD, AND SCANNING AND IMAGING METHOD

(71) Applicant: GE Precision Healthcare LLC, Wauwatosa, WI (US)

(72) Inventors: Liyuan Jin, Beijing (CN); Yaan Ge, Bejing (CN); Qingyu Dai, Beijing (CN); Kun Wang, Beijing (CN)

(73) Assignee: GE Precision Healthcare LLC, Wauwatosa, WI (US)

( * ) Notice: Subject to any disclaimer, the term of this patent is extended or adjusted under 35 U.S.C. 154(b) by 185 days.

(21) Appl. No.: 18/182,857

(22) Filed: Mar. 13, 2023

(65) Prior Publication Data

US 2023/0314541 A1 Oct. 5, 2023

(30) Foreign Application Priority Data

Mar. 18, 2022 (CN) .......................... 202210270315.2

(51) Int. Cl.
*G01R 33/56* (2006.01)
(52) U.S. Cl.
CPC ............................... *G01R 33/5608* (2013.01)
(58) Field of Classification Search
CPC ... A61B 5/0013; A61B 5/0035; A61B 6/5205; A61B 6/032; A61B 5/0263; A61B 8/587; A61B 8/5238; A61B 8/463; A61B 8/58; A61B 5/08; G06T 7/0012; G06T 2207/10088; G06T 2207/10081; G06T 2207/30004; G06T 2207/20221; G06T 5/50; G06T 2210/41; G06T 2207/10104; G06T 7/0014; G06T 5/60; G06T 2207/20212; G06T 15/00; G06T 7/10; G06T 7/30; G06T 7/337; G06T 19/20; G06T 2200/24; G06T 19/00; G06T 2207/20072; G06T 5/00; G01R 33/4835;

(Continued)

(56) References Cited

U.S. PATENT DOCUMENTS

| 7,928,729 | B2* | 4/2011 | Hargreaves | ........ G01R 33/4833 |
| | | | | 324/309 |
| 8,035,381 | B2* | 10/2011 | Lustig | ................ G01R 33/4828 |
| | | | | 324/309 |

(Continued)

OTHER PUBLICATIONS

Abuelhaija et al., "Power amplifier for magnetic resonance imaging using unconventional Cartesian feedback loop", 2015 German Microwave Conference, 119-122, 5 pages.

(Continued)

*Primary Examiner* — Vinh P Nguyen

(57) ABSTRACT

A method for determining a radio frequency power compensation parameter includes: using a plurality of scan sequences to scan a phantom in a plurality of slice positions by using a plurality of excitation frequencies; acquiring a plurality of magnetic resonance signals from the phantom corresponding to the plurality of slice positions and the plurality of excitation frequencies; and determining, according to the plurality of magnetic resonance signals, radio frequency power compensation parameters corresponding to respective slice positions in a three-dimensional space at respective excitation frequencies.

20 Claims, 9 Drawing Sheets

201
Use a plurality of signal sequences to scan a phantom in a plurality of slice positions by using a plurality of excitation frequencies 202
Acquire a plurality of magnetic resonance signals from the phantom corresponding to the plurality of slice positions and the plurality of excitation frequencies 203
Determine, according to the plurality of magnetic resonance signals, radio frequency power compensation parameters corresponding to respective slice positions in a three-dimensional space at respective excitation frequencies

(58) Field of Classification Search
CPC .. G01R 33/5608; G01R 33/58; G01R 33/543;
G01R 33/4806; G01R 33/4828; G01R
33/5607; G01R 33/56316; G01R 33/5659;
G01R 33/54; G01R 33/4818; G01R
33/481; G01R 33/385; G01R 33/4826;
G01R 33/3852; G01R 33/4816; G01R
33/243; G01R 33/20; G01R 33/246;
G01R 33/56366; G01R 33/565; G01R
33/3621; G01R 33/443; G01R 33/48;
G01R 33/422; G01R 33/4812; G01R
33/4822; G01R 33/3607; G01R 33/46;
A61N 5/1075
See application file for complete search history.

(56) References Cited

U.S. PATENT DOCUMENTS

| | | | | |
|---|---|---|---|---|
| 9,389,294 | B2* | 7/2016 | Sveinsson | G01R 33/56563 |
| 10,203,391 | B2* | 2/2019 | Lee | G01R 33/4835 |
| 10,768,261 | B2* | 9/2020 | Shi | G06T 5/73 |
| 11,698,424 | B2* | 7/2023 | Biber | G01R 33/3635 |
| | | | | 324/318 |
| 11,698,432 | B2* | 7/2023 | Lu | G01R 33/56563 |
| | | | | 324/309 |

OTHER PUBLICATIONS

Chico, G.T., "RF power amplifier linearity compensation for MRI systems", Submitted to the Department of Electrical Engineering and Computer Science in partial fulfillment of the requirements for the degree of Master of Engineering in Electrical Engineering and Computer Science, Sep. 2010, MIT, 46 pages.

Zanchi et al., "Frequency-offset Cartesian feedback for MRI power amplifier linearization. IEEE Transactions on Medical Imaging," 30(2), 512-522, Feb. 2011, 33 pages.

* cited by examiner

MAGNETIC RESONANCE IMAGING SYSTEM, COMPENSATION PARAMETER DETERMINING METHOD, AND SCANNING AND IMAGING METHOD

CROSS REFERENCE

The present application claims priority and benefit of Chinese Patent Application No. 202210270315.2 filed on Mar. 18, 2022, which is incorporated herein by reference in its entirety.

FIELD OF THE INVENTION

Embodiments of the present application relate to the technical field of medical apparatuses, and relate in particular to a magnetic resonance imaging system, a radio frequency power compensation parameter determining method, and a scanning and imaging method.

BACKGROUND OF THE INVENTION

Magnetic resonance imaging (MRI) systems have been widely applied in the field of medical diagnostics. A magnetic resonance imaging system typically has a main magnet, a radio frequency generator, a radio frequency power amplifier, a radio frequency transmitting coil, a surface coil, a gradient coil driver, a gradient coil assembly, etc. MRI utilizes the main magnet to generate a static magnetic field B0. When a subject to be examined is in the static magnetic field B0, nuclear spinning associated with hydrogen nuclei in a tissue of the subject to be examined is polarized, so that the tissue to be examined generates a longitudinal magnetization vector macroscopically. The radio frequency generator generates a radio frequency pulse, such as a radio frequency excitation pulse. The radio frequency power amplifier is configured to amplify a low-power radio frequency signal generated by the radio frequency generator to generate a high-power radio frequency signal that can excite a human tissue. The high-power radio frequency signal may be input to the radio frequency transmitting coil via a radio frequency transmitting line, so that the radio frequency transmitting coil transmits a radio frequency field B1 orthogonal to the B0 field to the subject to excite atomic nuclei in the aforementioned resonant region to generate a transverse magnetization vector. After the radio frequency field B1 is removed, the transverse magnetization vector decays in a spiral manner until the transverse magnetization vector is restored to zero. A free induction decay signal is generated during decay. The free induction decay signal can be acquired as a magnetic resonance signal, and an image of the tissue part to be examined can be reconstructed on the basis of the acquired signal.

Magnetic resonance imaging (especially quantitative MRI) requires precise radio frequency waveforms and power outputs to achieve precise excitation. However, during the above radio frequency amplification, problems, such as an amplifier gain and phase non-linearity, are introduced to the entire MRI system, so that the finally acquired image is distorted. Therefore, it is necessary to design some methods to compensate for distortion caused by radio frequency amplifiers.

BRIEF DESCRIPTION OF THE INVENTION

Currently, for gain compensation with respect to radio frequency excitation, it is necessary to measure gain compensation first. For example, a dummy load is connected to an output side interface of a particular transmission link assembly (e.g., an exciter, an amplifier, or a mixer), and measurement is performed by using additional hardware.

The inventor believes that the current gain compensation measurement has the following problems:

The current method can measure only gain compensation in a position before a mixer assembly in a transmission link, and the costs are high. In addition, radio frequency response at different frequencies is assessed only for each (single) transmission link assembly, and frequency dependent gain compensation is performed for each assembly. However, radio frequency response of an entire transmission link at different frequencies is not considered. Therefore, gain compensation of the entire transmission link at different frequencies cannot be accurately measured.

In view of at least one of the above technical problems, embodiments of the present application provide a magnetic resonance imaging system, a radio frequency power compensation parameter determining method, and a scanning and imaging method.

According to an aspect of the embodiments of the present application, provided is a radio frequency power compensation parameter determining method of a magnetic resonance imaging system, comprising using a plurality of scan sequences to scan a phantom in a plurality of slice positions by using a plurality of excitation frequencies. A plurality of magnetic resonance signals is acquired from the phantom corresponding to the plurality of slice positions and the plurality of excitation frequencies; and according to the plurality of magnetic resonance signals, radio frequency power compensation parameters corresponding to respective slice positions in a three-dimensional space at respective excitation frequencies are determined.

According to an aspect of the embodiments of the present application, provided is a scanning and imaging method of a magnetic resonance imaging system, comprising: determining an imaging sequence comprising a radio frequency pulse and a gradient pulse; determining a first radio frequency power compensation parameter corresponding to a selected slice position to be scanned and an excitation frequency from radio frequency power compensation parameters corresponding to respective slice positions in a three-dimensional space at respective excitation frequencies, wherein the radio frequency power compensation parameters corresponding to the respective slice positions in the three-dimensional space at the respective excitation frequencies are determined by the method according to the foregoing aspect; compensating for power of the radio frequency pulse according to the first radio frequency power compensation parameter; and applying the imaging sequence having undergone power compensation, and performing a diagnostic scan of a subject to be examined to acquire a magnetic resonance diagnosis image in a region of interest.

According to an aspect of the embodiments of the present application, provided is a magnetic resonance imaging system, comprising: a scanning unit; a controller, configured to control the scanning unit to use a plurality of scan sequences to scan a phantom in a plurality of slice positions by using a plurality of excitation frequencies, and acquire a plurality of magnetic resonance signals from the phantom corresponding to the plurality of slice positions and the plurality of excitation frequencies; and a processor, configured to determine, according to the plurality of magnetic resonance signals, radio frequency power compensation parameters corresponding to respective slice positions in a three-dimensional space at respective excitation frequencies.

One of beneficial effects of the embodiments of the present application is as follows: a plurality of received magnetic resonance signals corresponding to a plurality of slice positions and a plurality of excitation frequencies are acquired to determine radio frequency power compensation parameters corresponding to respective slice positions in a three-dimensional space at respective excitation frequencies, so as to perform radio frequency power compensation, so that radio frequency power distortion of an entire transmission link at different frequencies can be assessed without additional hardware-based measurement, thereby reducing measurement costs. In addition, the method can measure radio frequency power distortion involving loads in the entire transmission link and reception link, thereby improving the accuracy of compensation parameters.

With reference to the following description and accompanying drawings, specific implementations of the embodiments of the present application are disclosed in detail, and manners in which the principle of the embodiments of the present application is employed are illustrated. It should be understood that the implementations of the present application are not thereby limited in scope. Within the spirit and scope of the appended claims, the implementations of the present application comprise various changes, modifications, and equivalents.

BRIEF DESCRIPTION OF THE DRAWINGS

The accompanying drawings are included to provide further understanding of embodiments of the present application, constitute a part of the specification, and are used to illustrate implementations of the present application and set forth the principles of the present application together with textual description. Obviously, the accompanying drawings in the following description are merely some embodiments of the present application, and a person of ordinary skill in the art may obtain other implementations according to the accompanying drawings without the exercise of inventive effort. In the accompanying drawings.

DETAILED DESCRIPTION

The foregoing and other features of the embodiments of the present application will become apparent from the following description with reference to the accompanying drawings. In the description and the accompanying drawings, specific implementations of the present application are specifically disclosed, and part of the implementations in which the principles of the embodiments of the present application may be employed are indicated. It should be understood that the present application is not limited to the described implementations. On the contrary, the embodiments of the present application include all modifications, variations, and equivalents falling within the scope of the appended claims.

In the embodiments of the present application, the terms "first", "second", etc. are used to distinguish different elements, but do not represent a spatial arrangement or temporal order etc. of these elements, and these elements should not be limited by these terms. The term "and/or" includes any one of and all combinations of one or more associated listed terms. The terms "comprise", "include", "have", etc. refer to the presence of described features, elements, components, or assemblies, but do not exclude the presence or addition of one or more other features, elements, components, or assemblies.

In the embodiments of the present application, the singular forms "a", "the", etc. include plural forms, and should be broadly construed as "a type of" or "a class of" rather than limited to the meaning of "one." Furthermore, the term "said" should be construed as including both the singular and plural forms, unless otherwise specified in the context. In addition, the term "according to" should be construed as "at least in part according to . . . ", and the term "based on" should be construed as "at least in part based on . . . ", unless otherwise specified in the context.

The features described and/or illustrated for one implementation may be used in one or more other implementations in the same or similar manner, combined with features in other implementations, or replace features in other implementations. The term "include/comprise" when used herein refers to the presence of features, integrated components, steps, or assemblies, but does not preclude the presence or addition of one or more other features, integrated components, steps, or assemblies.

Figure 1:
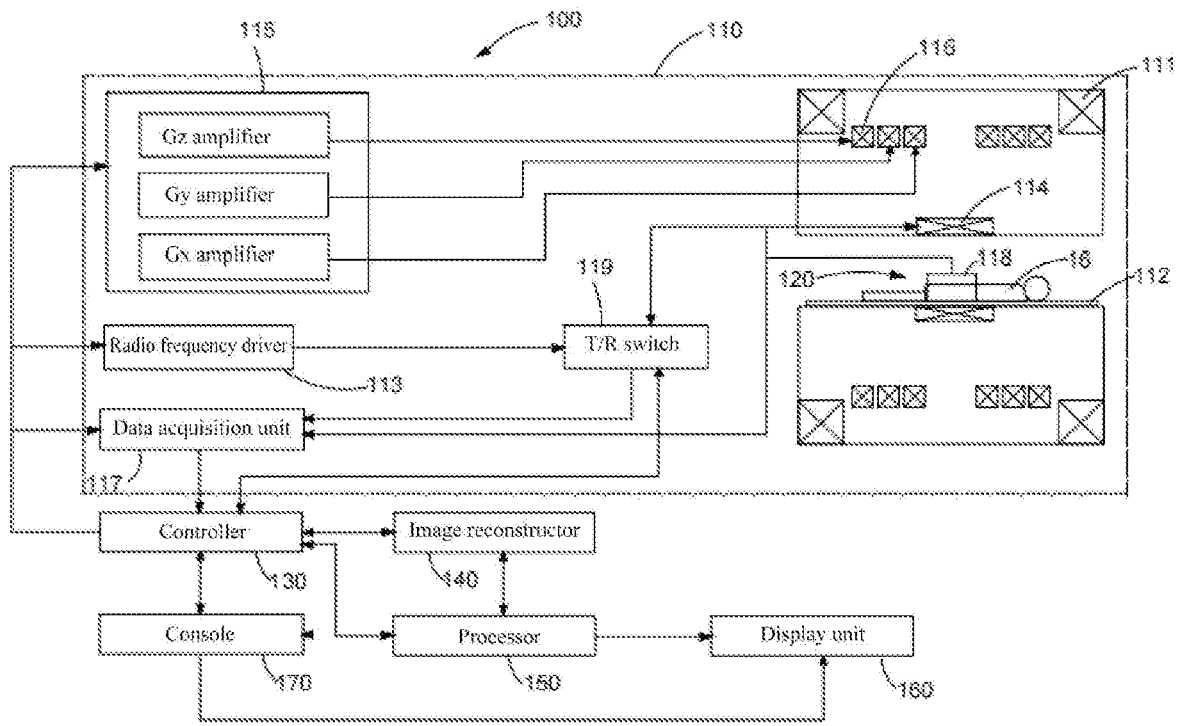
FIG. 1 is a schematic diagram of a magnetic resonance imaging system according to an embodiment of the present application.

For ease of understanding, FIG. 1 shows a magnetic resonance imaging (MRI) system 100 according to some embodiments of the present invention.

The MRI system 100 includes a scanning unit 110. The scanning unit 110 is configured to perform a magnetic resonance scan of a subject (e.g., a human body) 16 to generate image data of a region of interest of the subject 16. The region of interest may be a predetermined anatomical part or anatomical tissue.

The magnetic resonance imaging system 100 may include a controller 130 coupled to the scanning unit 110, and the controller 130 indicates an MRI scan sequence to be performed in an MRI scan to control the scanning unit 110 to perform the aforementioned magnetic resonance scan procedure.

The scanning unit 110 may include a main magnet assembly 111. The main magnet assembly 111 usually includes an annular superconducting magnet defined in a housing. The annular superconducting magnet is mounted in an annular vacuum container. The annular superconducting magnet and the housing thereof define a cylindrical space surrounding the subject 16, such as an imaging space 120 shown in FIG. 1. The main magnet assembly 111 generates a constant magnetic field, i.e., a B0 field, in a Z direction of the imaging space 120.

Usually, the Z direction is typically the direction extending from the head to the feet (or from the feet to the head) when the subject 16 is positioned on the table 112. For example, a selected layer may be a slice at any position in the Z direction. A uniform portion of the B0 field is formed in a central region of the main magnet.

The scanning unit 110 further includes a table 112 configured to carry the subject 16 and travel, in response to the control of the controller 130, in the Z direction to enter or exit the scanning chamber 120. For example, in an embodiment, an imaging volume of the subject 16 may be positioned in a central region of the imaging space 120 having uniform magnetic field strength, so as to facilitate scanning and imaging of the imaging volume of the subject 16.

The magnetic resonance imaging system 100 uses the formed B0 field to transmit a static magnetic field to the subject 16 located in the scanning chamber, so that protons in a resonant region in the body of the subject 16 precess in an ordered manner.

The scanning unit 110 further includes a radio frequency driver 113 and a radio frequency transmitting coil 114. The radio frequency transmitting coil 114 is configured, for example, to surround a region to be imaged of the subject 16. The radio frequency transmitting coil 114 may include, for example, a body coil disposed along an inner circumference of the main magnet, or a local coil dedicated to local imaging. The radio frequency driver 113 may include a radio frequency generator (not shown in the figure), a radio frequency power amplifier (not shown in the figure), and a gate modulator (not shown in the figure). The radio frequency driver 113 is configured to drive the radio frequency transmitting coil 114 and form a high-frequency magnetic field in space. Specifically, the radio frequency generator generates a radio frequency excitation signal on the basis of a control signal from the controller 130. The gate modulator modulates the radio frequency excitation signal into a signal having a predetermined envelope and predetermined timing. After being amplified by the radio frequency power amplifier, the modulated radio frequency excitation signal is outputted to the radio frequency transmitting coil unit 114, so that the radio frequency transmitting coil 114 transmits, to the subject 16, a radio frequency field B1 orthogonal to the B0 field so as to excite a proton in a slice to be imaged to spin. After a radio frequency excitation pulse ends, a magnetic resonance signal is generated during a process in which spinning of the excited proton relaxes and a magnetization vector returns to the initial state.

The aforementioned radio frequency transmitting coil 114 may be connected to a transmitting/receiving (T/R) switch 119. The transmitting/receiving switch 119 is controlled so that the radio frequency transmitting coil may be switched between a transmitting mode and a receiving mode. In the receiving mode, the radio frequency transmitting coil may be configured to receive, from the subject 16, a magnetic resonance signal having three-dimensional location information.

The three-dimensional location information of the magnetic resonance signal is generated by means of a gradient system of the MRI system, and this will be described in detail below.

The scanning unit 110 further includes a gradient coil driver 115 and a gradient coil assembly 116. The gradient coil assembly 116, on the one hand, forms a magnetic field gradient (a varying magnetic field) in the imaging space 120 so as to provide three-dimensional location information for the magnetic resonance signal, and on the other hand generates a compensating magnetic field of the B0 field to shim the B0 field.

The gradient coil assembly 116 may include three gradient coil systems, and the three gradient coil systems are configured to respectively generate magnetic field gradients that are oblique to three spatial axes (for example, the x-axis, y-axis, and z-axis) perpendicular to each other. The gradient coil driver 115 drives the gradient coil assembly 116 on the basis of a control signal from the controller 130, and therefore generates the gradient magnetic field in the imaging space 120. The gradient coil driver 115 includes gradient amplifiers respectively corresponding to the three gradient coil systems in the aforementioned gradient coil assembly. For example, the gradient coil driver 115 includes a Gz amplifier configured to drive a gradient in a z direction, a Gy amplifier configured to drive a gradient in a y direction, and a Gx amplifier configured to drive a gradient in an x direction.

More specifically, the gradient coil assembly 116 is configured to apply a magnetic field gradient in a slice selection direction (e.g., the z direction) to vary field strength in the region, so that precession frequencies of protons of imaged tissue in different layers (slices) of this region are different and thus layer selection is performed. Those skilled in the art understand that the layer is any one of a plurality of two-dimensional slices distributed in the Z direction in the three-dimensional imaging volume. When the imaging region is scanned, the radio frequency transmitting coil 114 responds to the aforementioned radio frequency excitation signal, then a layer having a precession frequency corresponding to this radio frequency excitation signal is excited. Further, the gradient coil assembly 116 is configured to separately apply a magnetic field gradient in a phase-encoding direction (e.g., the y direction) and a magnetic field gradient in a frequency-encoding direction (e.g., the x direction), so that magnetic resonance signals of excited layers have different phases and frequencies, thereby achieving phase encoding and frequency encoding.

The scanning unit 110 further includes a surface coil 118 usually arranged close to a scanned part (a region of interest) of the subject 16 (for example, covering or disposed on the body surface of the subject 16), and the surface coil 118 is also configured to receive the magnetic resonance signal.

The scanning unit 110 further includes a data acquisition unit 117 configured to acquire the magnetic resonance signal (for example, received by the body coil or the surface coil) in response to a data acquisition control signal of the controller 130. In an embodiment, the data acquisition unit 117 may include, for example, a radio frequency preamplifier (not shown in the figure), a phase detector (not shown in the figure), and an analog/digital converter (not shown in the figure). The radio frequency preamplifier is configured to amplify the magnetic resonance signal. The phase detector is configured to perform phase detection on the amplified magnetic resonance signal. The analog/digital converter is configured to convert the phase-detected magnetic resonance signal from an analog signal into a digital signal.

The data acquisition unit 117 is further configured to store the digitized magnetic resonance signal (or echo) into a K space in response to a data storage control signal of the controller 130. The K-space is a space to which raw data of magnetic resonance signals carrying spatial orientation encoding information is populated. The data acquisition unit 117 fills signals with different phase information and frequency information in the corresponding locations in the K-space according to a predetermined data filling method. In an example, the two-dimensional K-space may include a frequency-encoding line and a phase-encoding line. Data acquisition at each level may include multiple signal acquisition cycles (or repetition times TR). Each signal acquisition cycle may correspond to one change in the magnetic field gradient (incremental or decremental) in the phase-encoding direction (i.e., one signal acquisition is performed for each phase-encoding gradient applied), and the magnetic resonance signal acquired in each signal acquisition cycle is filled into a frequency-encoding line. Through multiple signal acquisition cycles, multiple frequency encoding lines having different phase information may be filled, and each acquired magnetic resonance signal has multiple decomposition frequencies.

The magnetic resonance imaging system 100 further includes an image reconstructor 140 configured to perform inverse Fourier transform on data stored in the K-space to reconstruct a three-dimensional image or a series of two-dimensional slice images of the imaging volume of the subject 16. Specifically, the image reconstructor 140 may perform the aforementioned image reconstruction on the basis of communication with the controller 130.

The magnetic resonance imaging system 100 further includes a processor 150. The processor 150 may include an image processor for image processing, and the image processor may perform any required image post-processing on the aforementioned three-dimensional image or any image in an image sequence. The post-processing may be an improvement or adaptive adjustment made to an image in any aspect of contrast, uniformity, sharpness, brightness, artifacts, etc. The processor 150 may further include a waveform processor configured to implement the waveform determination method according to an embodiment of the present invention. For example, the waveform processor generates a waveform on the basis of scanning parameters, performs waveform conversion, uses a converted waveform to determine driving/controlling parameters of the gradient amplifier, and the like.

In an embodiment, the controller 130, the image reconstructor 140, and the processor 150 may separately or collectively include a computer processor and a storage medium. The storage medium records a predetermined data processing program to be executed by the computer processor. For example, the storage medium may store a program configured to implement scanning processing (for example, including waveform design/conversion, and the like), image reconstruction, image processing, and the like. The storage medium may include, for example, a ROM, a floppy disk, a hard disk, an optical disk, a magneto-optical disk, a CD-ROM, or a non-volatile memory card.

The magnetic resonance imaging system 100 further includes a display unit 160, and the display unit 160 may be configured to display an operation interface and various data, images, or parameters generated in data acquisition and processing processes.

The magnetic resonance imaging system 100 further an operation console 170, and the operation console 170 may include user input devices, such as a keyboard, a mouse, etc. The controller 130 may communicate with the scanning unit 110, the image reconstructor 140, the processor 150, the display unit 160, etc., in response to a control command generated by a user on the basis of the operation console 170 or an operation panel/button, etc., disposed on the housing of the main magnet.

Those skilled in the art can understand that when imaging scanning is performed on the subject 16, the controller 130 can send sequence control signals to the aforementioned components (for example, the radio frequency driver 113, the gradient coil driver 115, etc.) of the scanning unit 110 by means of a sequence generator (not shown in the figure), so that the scanning unit 110 performs a preset scan sequence.

Those skilled in the art could understand that the "scan sequence" (also referred to as an imaging sequence or a pulse sequence in the following) refers to a combination of pulses having specific amplitudes, widths, directions, and time sequences and applied when a magnetic resonance imaging scan is performed. The pulses may typically include, for example, a radio frequency pulse and a gradient pulse. The radio frequency pulses may include, for example, radio frequency transmission pulses, radio frequency refocus pulses, inversion recovery pulses, etc. The gradient pulses may include, for example, the aforementioned gradient pulse for layer selection, gradient pulse for phase encoding, gradient pulse for frequency encoding, phase balance pulse for phase balance of proton precession, etc. Typically, a plurality of scan sequences can be preset in the magnetic resonance imaging system, so that the sequence suitable for clinical detection requirements can be selected. The clinical detection requirements may include, for example, a part to be imaged, an imaging function, an imaging effect, and the like.

Prior to the start of a magnetic resonance scan (a diagnostic scan), system correction needs to be performed to ensure that the system operates in an optimal state. Typically, the correction includes center frequency correction, radio frequency power correction, etc.

Due to a variety of factors, such as different human body shapes, different dielectric constants of human tissues, a dielectric constant difference between the human body and air, etc., different radio frequency powers need to be used for different patients and different scanned parts, and only in this way, can hydrogen protons be excited into a specified state. Thus, the radio frequency power needs to be re-adjusted before each scan to ensure that hydrogen protons of a scanned part are excited into a specified state. This process is referred to as radio frequency power correction or flip angle correction. The radio frequency power correction (gain compensation) accurately corrects a flip angle (also referred to as an excitation angle) into a predetermined angle of excitation An embodiment of the present application provides a mathematical model indicating radio frequency power distortion in the spatial domain and the frequency domain. The mathematical model can predict (or assess) radio frequency power compensation parameters (also referred to as radio frequency predistortion parameters or radio frequency pre-distortion coefficients) of respective spatial positions in a three-dimensional space at respective excitation frequencies. In the model, a plurality of received magnetic resonance signals corresponding to a plurality of slice positions and a plurality of excitation frequencies are acquired to determine radio frequency power compensation parameters corresponding to respective slice positions in a three-dimensional space at respective excitation frequencies, so as to perform radio frequency power compensation on the basis of the model, so that radio frequency power distortion of an entire transmission link at different frequencies can be assessed without additional hardware-based measurement, thereby reducing measurement costs. In addition, the method can measure radio frequency power distortion involving loads in the entire transmission link and reception link, thereby improving the accuracy of compensation parameters.

A radio frequency power compensation parameter determining method and a scanning and imaging method used in an MRI system will be described below with reference to embodiments.

Figure 2:
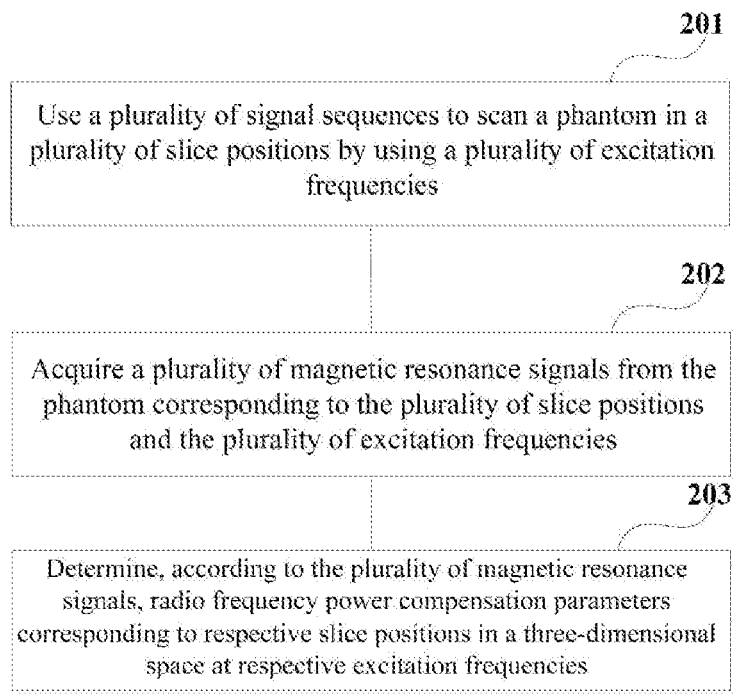
FIG. 2 is a schematic diagram of a radio frequency power compensation parameter determining method of a magnetic resonance imaging system according to an embodiment of the present application.

An embodiment of the present application provides a radio frequency power compensation parameter determining method of a magnetic resonance imaging system. FIG. 2 is a schematic diagram of determining radio frequency power compensation parameters of a magnetic resonance imaging system according to an embodiment of the present application. As shown in FIG. 2, the method includes: 201, using a plurality of scan sequences to scan a phantom in a plurality of slice positions by using a plurality of excitation frequencies; 202, acquiring a plurality of magnetic resonance signals from the phantom corresponding to the plurality of slice positions and the plurality of excitation frequencies; and 203, determining, according to the plurality of magnetic resonance signals, radio frequency power compensation parameters corresponding to respective slice positions in a three-dimensional space at respective excitation frequencies.

In some embodiments, each scan sequence includes a radio frequency excitation pulse, a first gradient pulse applied along with the radio frequency excitation pulse, and a second gradient pulse applied after the first gradient pulse, wherein gradient directions of the first gradient pulse and the second gradient pulse are inverse to each other, and the absolute value of gradient strength of the first gradient pulse and the absolute value of gradient strength of the second gradient pulse are equal. A flip angle of the radio frequency excitation pulse may be set to 90°. The waveform of the pulse may be a sine wave. The flip angle may also be set to another value greater than 70°, and the waveform of the pulse may also be set to another shape, which is not limited in the embodiments of the present application.

In some embodiments, the first gradient pulse and the radio frequency excitation pulse occur simultaneously. The gradient strength of the first gradient pulse remains constant while the first gradient pulse is being applied along with the radio frequency excitation pulse. The first gradient pulse and the second gradient pulse may be applied by a gradient coil assembly in a z direction. By means of the first gradient pulse and the second gradient pulse, a magnetic field gradient is applied to a slice selection direction (e.g., the z direction), so that precession frequencies of protons of an imaged tissue in different layers (also referred to as slices) of this region are different. When the imaging region is scanned, a layer having a precession frequency corresponding to the radio frequency excitation pulse is excited, and thus layer (slice position) selection is performed. The layer refers to any one of a plurality of two-dimensional slice positions distributed in the z direction in a three-dimensional imaging volume. In all examples for illustration, the slice positions in the embodiments of the present application are two-dimensional slice positions distributed in the z direction, but the embodiments of the present application are not limited thereto. The slice positions may also be two-dimensional slices in another direction.

In some embodiments, for each slice position in different slice positions, magnetic resonance signals at more excitation frequencies may be acquired by adjusting the strength value of the gradient pulse. Thus, the absolute values of the gradient strength of the first gradient pulses or the second gradient pulses in different scan sequences may be different, and the strength of radio frequency excitation pulses in different scan sequences may be the same or different.

Figure 3:
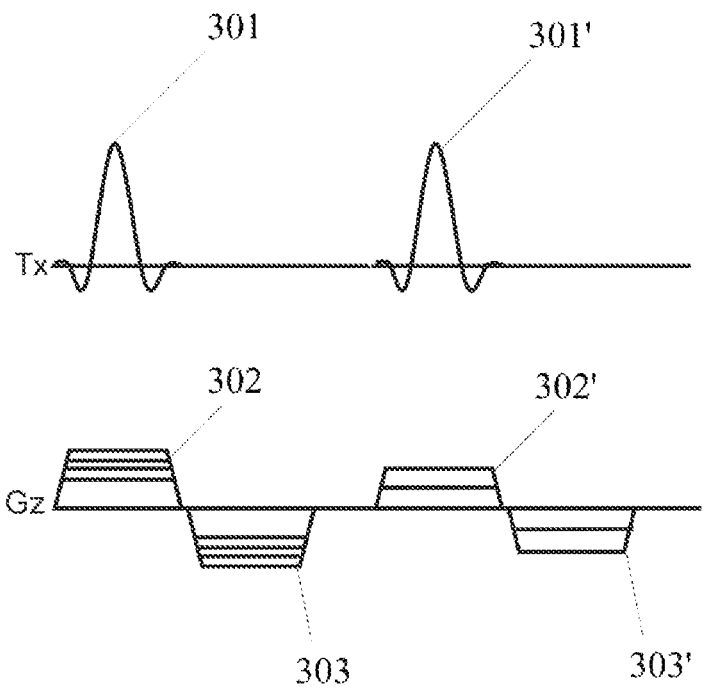
FIG. 3 is a schematic diagram of scan sequences according to an embodiment of the present application.

FIG. 3 is a schematic diagram of two scan sequences. As shown in FIG. 3, a first scan sequence includes a radio frequency excitation pulse 301, a first gradient pulse 302 applied along with the radio frequency excitation pulse 301, and a second gradient pulse 303 applied after the first gradient pulse, and a second scan sequence includes a radio frequency excitation pulse 301', a first gradient pulse 302' applied along with the radio frequency excitation pulse 301', and a second gradient pulse 303' applied after the first gradient pulse. Waveforms of the radio frequency excitation pulses 301 and 301' are sinc waves. The gradient strength of the first gradient pulse 302 and the gradient strength of the first gradient pulse 302' are different. The above description is provided by using only the example in which two scan sequences are provided. In the embodiments of the present application, the number of scan sequences is greater than or equal to two, and examples are not numerated herein.

In some embodiments, in 201, a scanning unit of the magnetic resonance imaging system may perform scans of the plurality of scan sequences in a plurality of slice positions. That is, the phantom is scanned in a plurality of slice positions by using a plurality of excitation frequencies. The positions and the number of the plurality of slices may be set as required, and the embodiments of the present application are not limited thereto. For example, the number of slices may be set to three, five, seven, nine, etc. A slice, on which no scan sequence has been performed, may also be present between two adjacent slices of a plurality of slices. For example, for each scan sequence, one scan is respectively performed for the plurality of slice positions. The scan of the scan sequence is performed in each slice position of the plurality of slice positions. Each time the strength value of the gradient pulse is changed (that is, each time a scan sequence is changed), the plurality of slice positions need to be scanned once again.

In some embodiments, to ensure that the subjects to be excited in different slice positions are the same, the phantom to be scanned includes three elongated cavities orthogonal to each other. Respective centers of the three elongated cavities coincide with an orthogonal intersection, and cross-sectional areas of the three elongated cavities are equal. During a scan, the three elongated cavities are respectively parallel to an x-axis, a y-axis, and a z-axis of a scan space. The material of the phantom may be plastic, foam, or any other material not affected by the magnetic field.

In some embodiments, the length of the elongated cavity is greater than or equal to a first threshold. The first threshold is, for example, greater than or equal to 40 cm. That is, the elongated cavity needs to be long enough so that the phantom can cover a sufficiently large scan range. However, the lengths of the three elongated cavities may be the same or different, and the embodiments of the present application are not limited thereto. For example, the length of the elongated cavity in the z direction may be greater than the lengths of the elongated cavities in the other two directions. A cross-sectional area diameter of the elongated cavity is less than or equal to a second threshold. The second threshold is, for example, less than or equal to 2 cm. That is, the elongated cavity needs to be thin enough so as not to be affected by non-uniformity of a B0 field.

Figure 4:
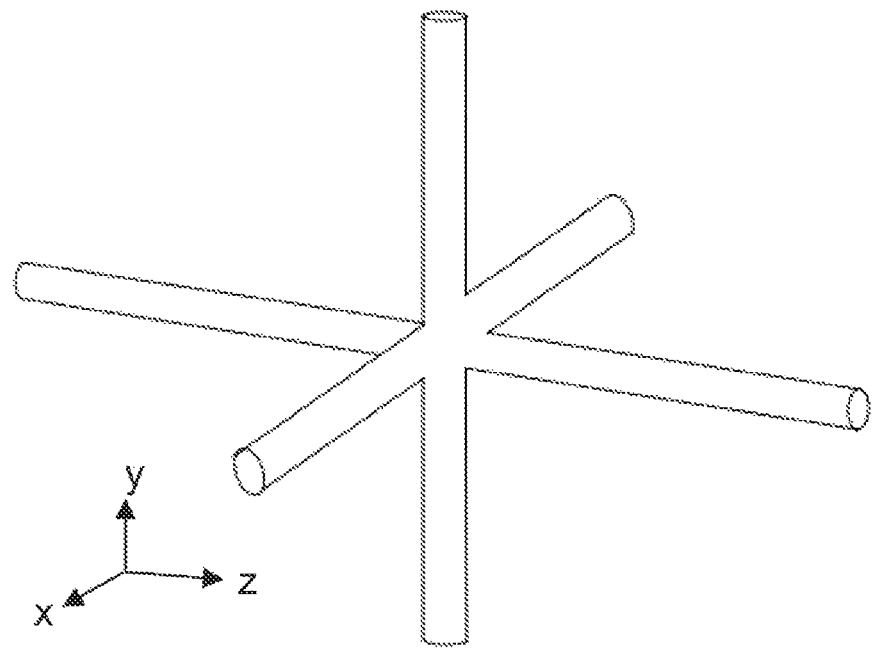
FIG. 4 is a schematic diagram of an implementation of a phantom according to an embodiment of the present application.

FIG. 4 is a schematic diagram of an implementation of a phantom according to an embodiment of the present application. As shown in FIG. 4, the elongated cavity is a cylindrical cavity or a rectangular cavity, and phantom resonance liquids (or resonance objects or resonance media or resonance tissues) contained in the three elongated cavities are the same (both ingredients and concentrations are the same). For example, the phantom resonance liquid may be a substance to be excited, e.g., water or oil or nickel chloride, etc.

In some embodiments, to scan the phantom in a plurality of slice positions, a center of the phantom needs to be positioned at a non-scan center, and the first sub-scan of the phantom is performed; then, the center of the phantom is positioned at a scan center, and the second sub-scan of the phantom is performed.

Figure 5:
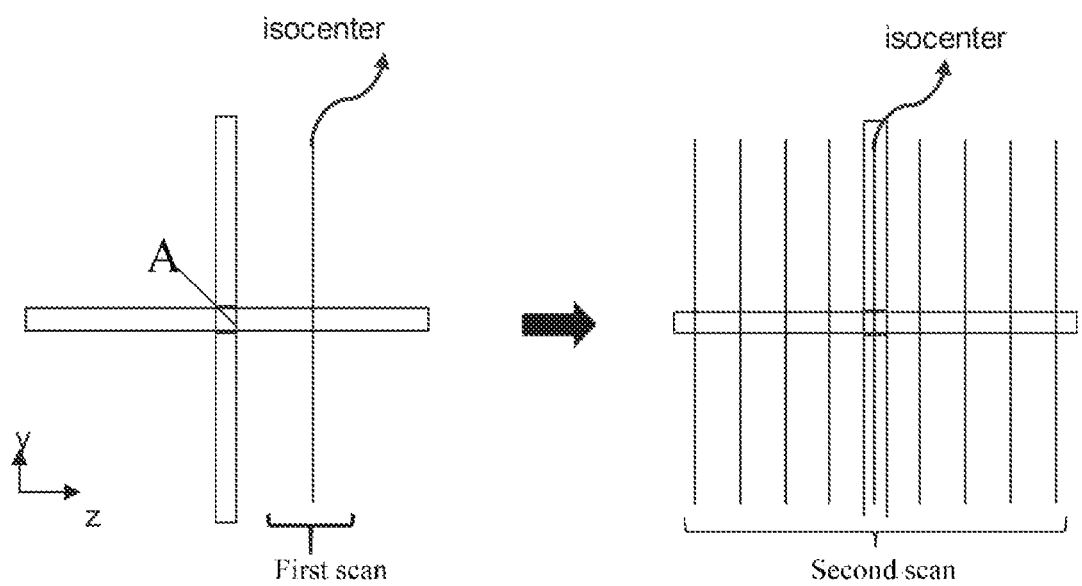
FIG. 5 is a schematic diagram of a scan procedure according to an embodiment of the present application.

FIG. 5 is a schematic diagram of the scan procedure. During the first sub-scan, the center (i.e., the orthogonal intersection) of the phantom is placed at the non-scan center (A), but the first sub-scan of the phantom is performed in a slice position of a central layer. The central layer represents a layer passing through a magnet center. The slice position of the central layer is also referred to as a central slice. A non-central layer represents a layer not passing through the magnet center. A slice position of the non-central layer is also referred to as a non-central slice. However, the embodiments of the present application are not limited thereto. Alternatively, the first sub-scan of the phantom can be performed in a plurality of slice positions, but the plurality of slice positions need to include the slice position of the central layer. Therefore, after the first sub-scan, data (a magnetic resonance signal) of the slice position of the central layer can be acquired. During the second sub-scan, the center (i.e., the orthogonal intersection) of the phantom is placed at the scan center (isocenter), and the second sub-scan of the phantom is performed in a plurality of slice positions. The plurality of slice positions may or may not include the slice position of the central layer. Therefore, after the second sub-scan, data (a plurality of magnetic resonance signals) of the plurality of slice positions can be acquired.

However, during the second sub-scan, the phantom resonance liquid excited in the slice position of the central layer and the phantom resonance liquid excited in the slice position of the non-central layer are different. That is, a subject region scanned in a slice position other than the slice position of the central layer includes only the cross-sectional area size of the elongated cavity, but a subject region scanned in the slice position of the central layer further includes, in addition to the cross-sectional area size of the elongated cavity, partial regions of the other two elongated cavities. That is, the amount of the phantom resonance liquid excited in the slice position of the central layer is greater than the amount of the phantom resonance liquid excited in the slice position of the non-central layer. During the first sub-scan, a subject region scanned in the slice position of the central layer includes only the cross-sectional area size of the elongated cavity. That is, the amount of the phantom resonance liquid excited in the slice position of the central layer in the first sub-scan is the same as the amount of the phantom resonance liquid excited in the slice position of the non-central layer in the second sub-scan. Therefore, in order to acquire magnetic resonance signals quantitatively, if the second sub-scan includes the scan of the slice position of the central layer, data of the slice position of the central layer acquired by the second sub-scan can be replaced with data of the slice position of the central layer acquired by the first sub-scan to acquire the plurality of magnetic resonance signals. If the second sub-scan does not include the scan of the slice position of the central layer, the data of the slice position of the scan central layer acquired by the first sub-scan and data of slice positions of other layers acquired by the second sub-scan can be combined to acquire the plurality of magnetic resonance signals.

It should be noted that the first sub-scan and the second sub-scan are two sub-scans in one scan performed for each scan sequence and a plurality of slice positions. That is, each time the strength value of the gradient pulse is changed (that is, each time a scan sequence is changed), the two sub-scans need to be performed again for the plurality of slice positions.

Figure 6:
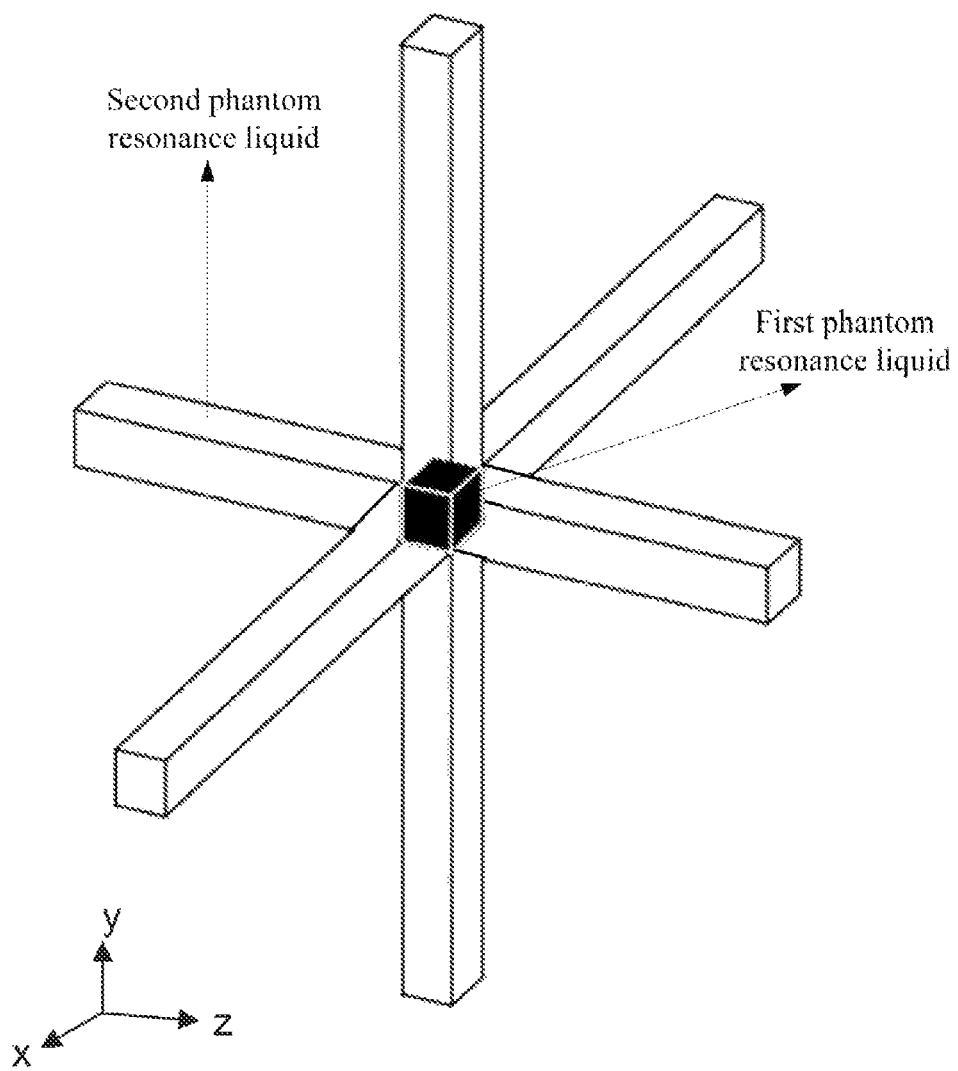
FIG. 6 is a schematic diagram of another implementation of a phantom according to an embodiment of the present application.

FIG. 6 is a schematic diagram of another implementation of a phantom according to an embodiment of the present application. As shown in FIG. 6, the elongated cavity is a rectangular cavity, thereby ensuring that a cross section in the position of an intersection is the same as a cross section not in the position of the intersection. A cubic cavity where the three elongated cavities intersect contains a first phantom resonance liquid, and a second phantom resonance liquid is contained in positions in the three elongated cavities except the position of the cubic cavity. Longitudinal relaxation times T1 of the first phantom resonance liquid and the second phantom resonance liquid are different. The longitudinal relaxation time T1 refers to a parameter of time that has elapsed for restoring longitudinal magnetization strength from zero to a balanced state (for example, 63% of the maximum of the longitudinal magnetization strength) after the radio frequency excitation pulse applied in the magnetic resonance imaging system stops. A method for achieving different longitudinal relaxation times is as follows: ingredients of the first phantom resonance liquid are different from ingredients of the second phantom resonance liquid. For example, the first phantom resonance liquid may include nickel chloride, and the second resonance tissue may include water. In another implementation manner, the first phantom resonance liquid and the second phantom resonance liquid may be solutions of the same compound, but have different concentrations, which is not limited in the embodiments of the present application.

In some embodiments, to scan the phantom in a plurality of slice positions, the center of the phantom needs to be positioned at the scan center, and the phantom is scanned in the plurality of slice positions.

Figure 7:
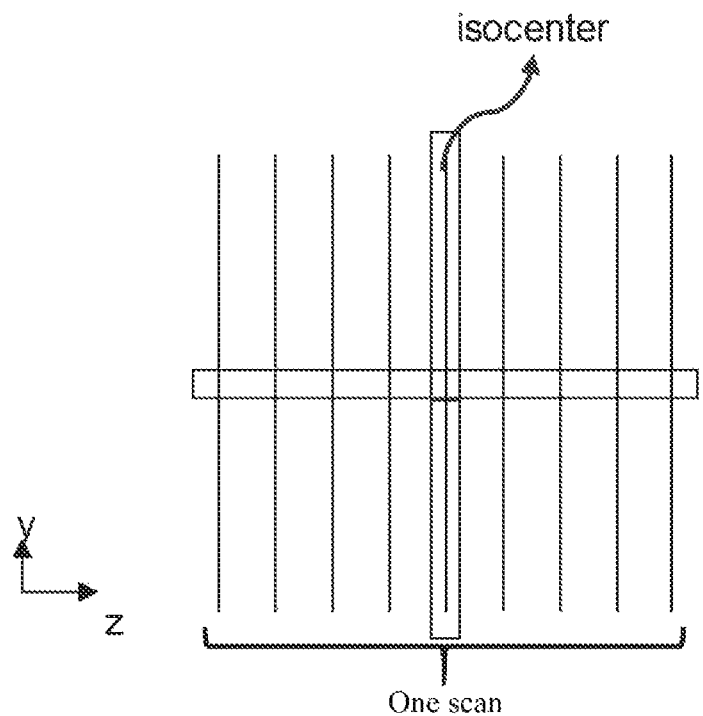
FIG. 7 is a schematic diagram of another scan procedure according to an embodiment of the present application.

FIG. 7 is a schematic diagram of the scan procedure. In one scan, the center (i.e., the orthogonal intersection) of the phantom is placed at the scan center (isocenter), and one scan of the phantom is performed in a plurality of slice positions. In this way, the phantom resonance liquid excited in the slice position of the central layer and the phantom resonance liquid excited in the slice position of the non-central layer are different. That is, a subject region scanned in a slice position other than the slice position of the central layer includes only the cross-sectional area size of the elongated cavity, and the excited phantom resonance liquid is the second phantom resonance liquid. However, a subject region scanned in the slice position of the central layer further includes, in addition to the cross-sectional area size of the elongated cavity, partial regions of the other two elongated cavities. That is, phantom resonance liquids excited in the slice position of the central layer include the first phantom resonance liquid and the second phantom resonance liquid. Since the first phantom resonance liquid and the second phantom resonance liquid have the different longitudinal relaxation times T1, in order to suppress the second phantom resonance liquid and acquire only data of the first phantom resonance liquid during acquisition of a magnetic resonance signal of the slice position of the central layer, a scan sequence for performing a scan in the slice position of the central layer further includes an inversion recovery pulse applied before the radio frequency excitation pulse. That is, an inversion recovery pulse is applied before the radio frequency excitation pulse to suppress the second phantom resonance liquid.

In this way, after one scan, for a plurality of slice positions (including the slice position of the central layer and the slice position of the non-central layer), data of the same cross-sectional area and different phantom resonance liquids can be acquired. That is, for the slice position of the central layer, data of the first phantom resonance liquid is acquired. For the slice position of the non-central layer, data of the second phantom resonance liquid of the same cross-sectional area is acquired. In order to acquire magnetic resonance signals quantitatively, since the type of the first phantom resonance liquid and the type of the second phantom resonance liquid are known, the data corresponding to the first phantom resonance liquid of the slice position of the central layer may be multiplied by a known first proportion coefficient to convert the same into data corresponding to the second phantom resonance liquid of the slice position of the central layer with which data corresponding to the second phantom resonance liquid of the slice position of the non-central layer is combined to acquire a plurality of magnetic resonance signals. Alternatively, the data corresponding to the second phantom resonance liquid of the slice position of the non-central layer may be multiplied by a known second proportion coefficient to convert the same into data corresponding to the first phantom resonance liquid of the slice position of the non-central layer with which data corresponding to the first phantom resonance liquid of the slice position of the central layer is combined to acquire a plurality of magnetic resonance signals.

It should be noted that an excitation frequency of the radio frequency excitation pulse in the scan sequence for the scan of the slice position of the non-central layer and an excitation frequency of the radio frequency excitation pulse in the scan sequence for the scan of the slice position of the central layer are different, so that the second phantom resonance liquid and the first phantom resonance liquid are respectively excited. In addition, the scan sequence for the scan of the slice position of the non-central layer does not need to include any inversion recovery pulse.

In some embodiments, the magnetic resonance signal acquired in 202 refers to signal data received from a coil before image reconstruction. For each slice position in a plurality of slice positions and for each scan sequence, a corresponding magnetic resonance signal can be acquired.

In some embodiments, since the absolute values of gradient strength of gradient pulses of different scan sequences are different, a plurality of magnetic resonance signals corresponding to more different excitation frequencies are acquired by changing the gradient strength value of the gradient pulse in the scan sequence. That is, for each slice position in the plurality of slice positions, a plurality of magnetic resonance signals corresponding to different excitation frequencies of different scan sequences can be acquired respectively. For example, for each slice position d in the plurality of slice positions and for each scan sequence in the plurality of scan sequences (an excitation frequency corresponding to the slice position d is f), one magnetic resonance signal corresponding to the slice position d and the excitation frequency f can be acquired. Therefore, for different slice positions and different scan sequences, a plurality of magnetic resonance signals corresponding to the different slice positions and the different excitation frequencies can be acquired.

Figure 10:
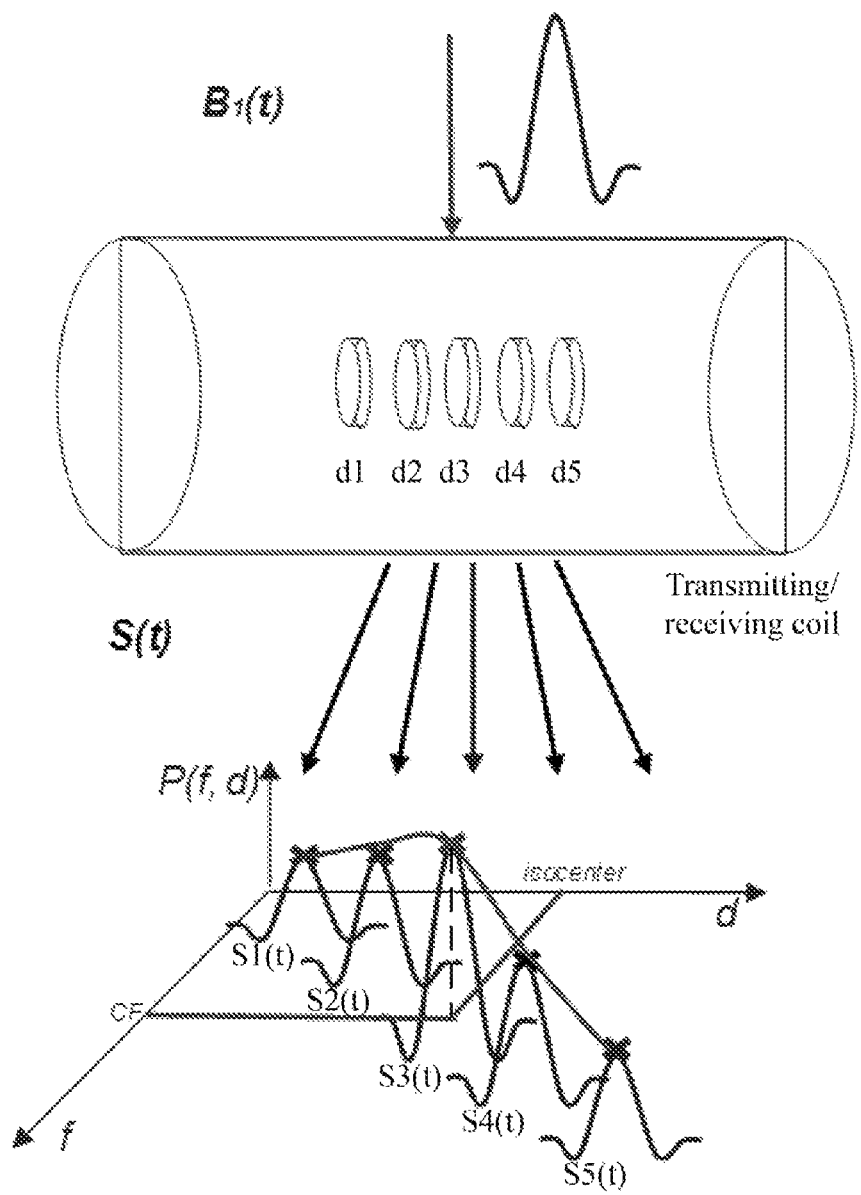
FIG. 10 is a schematic diagram of a plurality of magnetic resonance signals according to an embodiment of the present application.

For example, for slice positions d1, d2, d3, d4, and d5 and for a scan sequence, excitation frequencies corresponding to the different slice positions are respectively an excitation frequency f1 corresponding to the slice position d1, an excitation frequency f2 corresponding to the slice position d2, an excitation frequency f3 corresponding to the slice position d3, an excitation frequency f4 corresponding to the slice position d4, and an excitation frequency f5 corresponding to the slice position d5. Therefore, a magnetic resonance signal $S1(t)$ corresponding to the slice position d1 and the excitation frequency f1, a magnetic resonance signal $S2(t)$ corresponding to the slice position d2 and the excitation frequency f2, a magnetic resonance signal $S3(t)$ corresponding to the slice position d3 and the excitation frequency f3, a magnetic resonance signal $S4(t)$ corresponding to the slice position d4 and the excitation frequency f4, and a magnetic resonance signal $S5(t)$ corresponding to the slice position d5 and the excitation frequency f5 can be acquired. FIG. 10 is a schematic diagram of the plurality of acquired magnetic resonance signals. As shown in FIG. 10, for a scan sequence, for a radio frequency excitation pulse $B1(t)$, and for the slice positions d1, d2, d3, d4, and d5, the magnetic resonance signals $S1(t)$, $S2(t)$, $S3(t)$, $S4(t)$, and $S5(t)$ can be acquired.

For the slice positions d1, d2, d3, d4, and d5 and for another scan sequence (that is, when an excitation frequency is changed by changing the strength of the gradient pulse), excitation frequencies corresponding to the different slice positions are respectively an excitation frequency f1' corresponding to the slice position d1, an excitation frequency f2' corresponding to the slice position d2, an excitation frequency f3' corresponding to the slice position d3, an excitation frequency f4' corresponding to the slice position d4, and an excitation frequency f5' corresponding to the slice position d5. Therefore, a magnetic resonance signal S1'(t) corresponding to the slice position d1 and the excitation frequency f1', a magnetic resonance signal S2'(t) corresponding to the slice position d2 and the excitation frequency f2', a magnetic resonance signal S3'(t) corresponding to the slice position d3 and the excitation frequency f3', a magnetic resonance signal S4'(t) corresponding to the slice position d4 and the excitation frequency f4', and a magnetic resonance signal S5'(t) corresponding to the slice position d5 and the excitation frequency f5' can be acquired, and so on, so that a plurality of magnetic resonance signals corresponding to different excitation frequencies of different scan sequences and different slice positions are acquired respectively.

It should be noted that the above slice positions d1, d2, d3, d4, and d5 are merely illustrative, and different slice positions and different numbers of slices may be selected as desired, which is not limited in the embodiments of the present application. When the number of slice positions is N1 and the number of scan sequences is N2 (the strength value of the gradient pulse is changed N2 times), N1 magnetic resonance signals can be acquired from each scan. After N2 scans, a total of N1×N2 magnetic resonance signals can be acquired.

In some embodiments, to improve compensation precision, after magnetic resonance signals are acquired, the plurality of magnetic resonance signals can be preprocessed respectively. The preprocessing includes at least eliminating an error caused by at least one of a relaxation rate, an initial phase (caused by factors such as non-uniformity of a B1 field), polarization, and time offset. Reference may be made to the prior art for the details, and the details will not be described in the present application again. In addition, in 203, the radio frequency power compensation parameters corresponding to the respective slice positions in the three-dimensional space at the respective excitation frequencies are determined according to the plurality of preprocessed magnetic resonance signals.

In some embodiments, the second gradient pulse is behind the first gradient pulse, and when the second gradient pulse is applied, one magnetic resonance signal S(t) from the phantom corresponding one slice position of the plurality of slice positions is acquired. That is, a constant gradient used during radio frequency excitation is inversed during signal reception. That is, the second gradient pulse is applied to acquire a magnetic resonance signal. That is, t=0 in S(t) corresponds to the start of a second pulse sequence. In addition, in order to acquire a plurality of magnetic resonance signals corresponding to a plurality of slice positions, the second gradient pulse needs to be applied a plurality of times. That is, when the second gradient pulse is applied, a single magnetic resonance signal corresponding to one slice position is acquired, and when the second pulse gradient is applied again, one magnetic resonance signal corresponding to a next slice position is acquired. That is, a scan of a scan sequence is performed on each slice position of the plurality of slice positions. When the scan sequence is applied to a slice position and when the second gradient pulse in the scan sequence is applied, one magnetic resonance signal corresponding to the slice position can be acquired. When the same group of signal sequence numbers is applied to a next slice position and when the second gradient pulse in the scan sequence is applied, one magnetic resonance signal corresponding to the next slice position can be acquired, and so on, until a plurality of magnetic resonance signals corresponding to the plurality of slice positions are acquired when the scan is performed by using the scan sequence. Then, the same method is used to acquire a plurality of magnetic resonance signals corresponding to the plurality of slice positions when the scan is performed by using a next scan sequence, until a plurality of magnetic resonance signals corresponding to the plurality of slice positions are acquired when the scan is performed by using all scan sequences. As shown in FIG. 3, at the start of the second gradient pulse 303 and the second gradient pulse 303', reception of a magnetic resonance signal is performed. The magnetic resonance signal S(t) (e.g., a preprocessed magnetic resonance signal) is proportional to a time inverse signal of the radio frequency excitation pulse $B_1(t)$, i.e., $S(t) \propto B_1(\tau-t)$. Therefore, the magnetic resonance signal S(t) (e.g., a preprocessed magnetic resonance signal) can be used to assess radio frequency power distortion.

In some embodiments, a square root of a main lobe peak of the received magnetic resonance signal S(t) (e.g., a preprocessed magnetic resonance signal) can reflect a relative energy value of radio frequency excitation, that is, reflecting an energy drop ratio of a slice position close to the center relative to a slice position in the center. Therefore, the square root of the main lobe peak can be used as a radio frequency power compensation parameter. In the embodiments of the present application, fitting is performed on square roots of main lobe peaks of a plurality of slice positions and a plurality of excitation frequencies to acquire radio frequency power compensation parameters corresponding to respective slice positions in the three-dimensional space (including slice positions other than the plurality of above slice positions) at the respective excitation frequencies. Details will be provided below.

Figure 8:
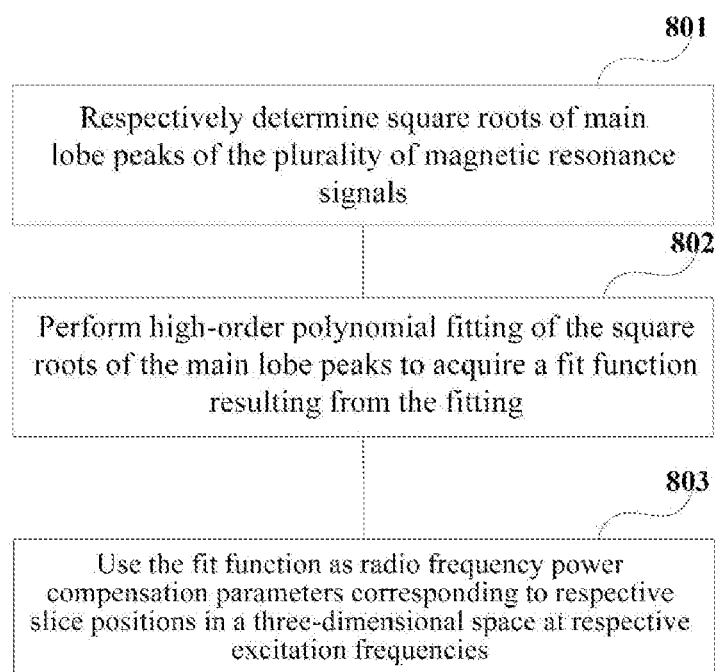
FIG. 8 is a schematic diagram of an implementation of an operation 103 according to an embodiment of the present application.

FIG. 8 is a schematic diagram of an implementation of an operation 203. As shown in FIG. 8, the operation 203 includes: 801, respectively determining square roots of main lobe peaks of the plurality of magnetic resonance signals; 802, performing high-order polynomial fitting of the square roots of the main lobe peaks to acquire a fit function resulting from the fitting; and 803, using the fit function as radio frequency power compensation parameters corresponding to respective slice positions in a three-dimensional space at respective excitation frequencies.

In some embodiments, in 801, for the plurality of magnetic resonance signals acquired in 202, the square root of the main lobe peak of each magnetic resonance signal is determined respectively. For example, for each slice position of the plurality of slice positions, square roots of main lobe peaks of a plurality of magnetic resonance signals corresponding to different excitation frequencies of different scan sequences are acquired respectively. Thus, square roots of a plurality of main lobe peaks corresponding to different slice positions and different excitation frequencies can be acquired. The square root of the main lobe peak is represented by P in the following. As shown in FIG. 10, the slice position, the excitation frequency, and the square root of the main lobe peak are regarded as three mutually orthogonal coordinate axes of a space coordinate system. The origin of the coordinate axes refers to an intersection between the farthest slice position that can be scanned and the farthest center frequency. It should be noted that the center frequency (CF) and the scan center (isocenter) slice position can also be used as the origin of the coordinate axes, which is not limited in the embodiments of the present application. In the embodiments of the present application, the slice position d refers to the shortest distance between the slice position and the origin of the coordinate axes. The square root of each main lobe peak can be regarded as a coordinate point in the space coordinate system. The coordinate point can be represented by P(f, d). The square roots of the plurality main lobe peaks can be regarded as a plurality of discretely distributed points in the coordinate system. In 802 and 803, the high-order polynomial fitting can be performed according to the square roots of the plurality of main lobe peaks to acquire the fit function. Independent variables of the fit function are the slice position and the excitation frequency. A function value of a dependent variable is the square root of the main lobe peak. The fit function defines a correspondence relationship between each slice position, each excitation frequency and a radio frequency power compensation parameter. The fit function is continuous, so that a square root of a main lobe peak corresponding to any slice position in the three-dimensional space and any excitation frequency can be acquired according to the fit function. That is, a square root of a main lobe peak corresponding to any slice position in the three-dimensional space and each excitation frequency of any slice position under the action of different layer selection gradients can be acquired. That is, a corresponding discrete point set including slice positions, excitation frequencies, and square roots of main lobe peaks is established, and a continuous function on a continuous set is acquired by performing fitting on the basis of the discrete point set. The discrete point set is included in the continuous set. By means of the fit function (the continuous function) resulting from the fitting, a square root of a main lobe peak of a slice position where no scan is performed and an excitation frequency can be acquired. A radio frequency power compensation parameter corresponding to each slice position and each excitation frequency is determined according to the fit function. Stated differently, a radio frequency power compensation parameter corresponding to each slice position in the three-dimensional space and each excitation frequency is modeled into a higher-order function dependent on a slice position and an excitation frequency. The greater the number of main lobe peaks corresponding to received magnetic resonance signals, the more accurate a fitting result. For the high-order fitting method, reference may be made to the prior art, and the embodiments of the present application are not limited thereto.

Figure 9:
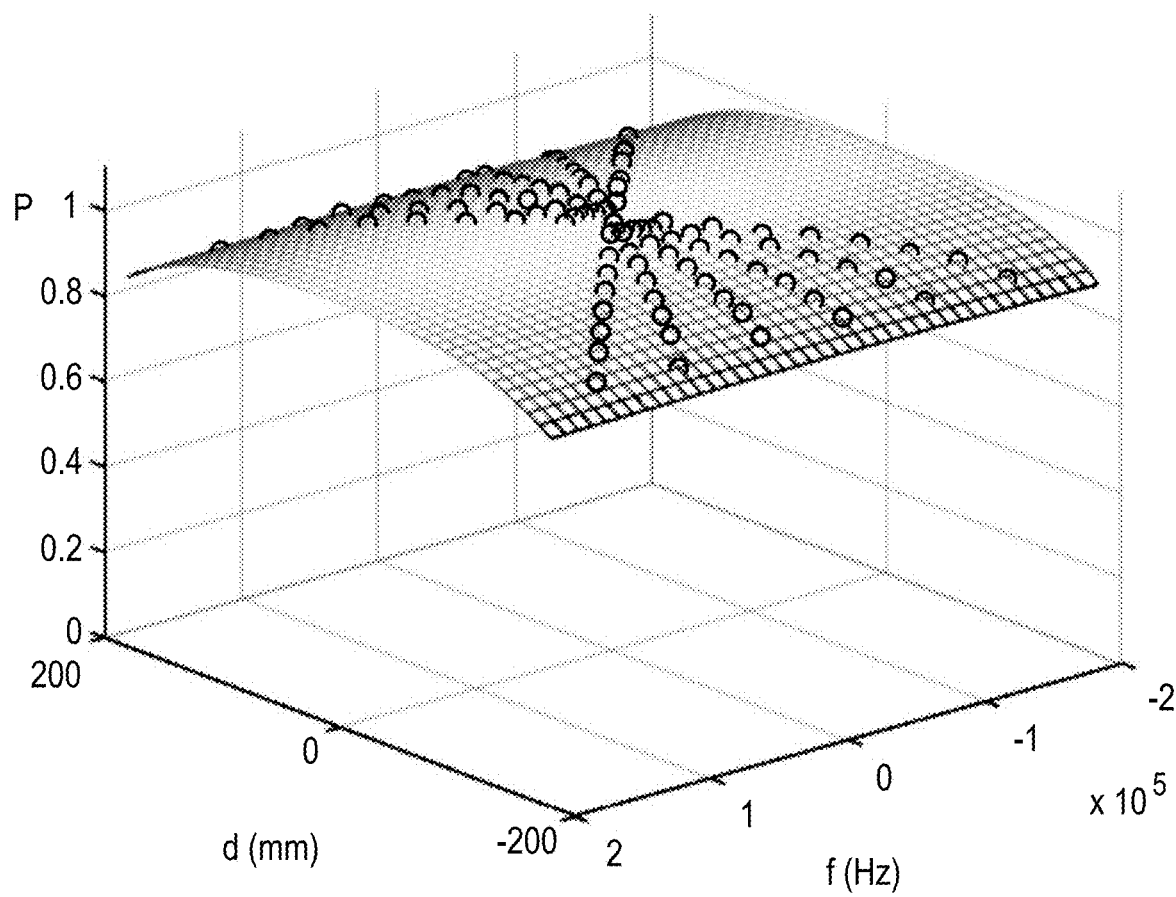
FIG. 9 is a schematic diagram of fitting of square roots of main lobe peaks according to an embodiment of the present application.

FIG. 9 is a schematic diagram of fitting of square roots of main lobe peaks. As shown in FIG. 9, a plurality of discrete round points in FIG. 9 are acquired square roots of a plurality of main lobe peaks corresponding to different slice positions and different excitation frequencies. Fitting is performed on the plurality of discrete points to acquire a fit function (a curved surface in the figure). The fit function may be regarded as a mathematical model indicating radio frequency power distortion in the spatial domain and the frequency domain. A radio frequency power compensation parameter corresponding to any slice position in the three-dimensional space and any excitation frequency can be determined according to the fit function. Hence, the non-uniformity of the B1 field is greatly reduced during a formal scan.

In all above examples for illustration, the slice positions are two-dimensional slice positions distributed in the z direction, but the slice positions may also be two-dimensional slices in another direction. That is, in the embodiments of the present application, for a slice position in one or more arbitrary directions, a radio frequency power compensation parameter corresponding to a slice position in each direction at each excitation frequency can be determined. Implementations of determining radio frequency power compensation parameters in respective directions are the same, and will not be numerated herein.

The above radio frequency power compensation parameter determining process may occur in a system correction process preceding a diagnostic scan. The above radio frequency power compensation parameters may be stored in a system configuration correction file, prestored in a magnetic resonance imaging system, and used in a diagnostic scan process. Details will be described in the following embodiments.

It should be noted that FIGS. 2 and 8 merely schematically illustrates the embodiments of the present application, but the present application is not limited thereto. For example, the order of execution between operations may be suitably adjusted. In addition, some other operations may also be added or some of these operations may be omitted. Those skilled in the art could make appropriate variations according to the above disclosure, rather than being limited by the disclosure of FIGS. 2 and 8.

The above embodiments merely provide illustrative description of the embodiments of the present application. However, the present application is not limited thereto, and appropriate variations may be made on the basis of the above embodiments. For example, each one of the above embodiments may be used independently, or one or more of the above embodiments may be combined.

It can be seen from the above embodiments that a plurality of received magnetic resonance signals corresponding to a plurality of slice positions and a plurality of excitation frequencies are acquired to determine radio frequency power compensation parameters corresponding to respective slice positions in a three-dimensional space at respective excitation frequencies, so as to perform radio frequency power compensation, so that radio frequency power distortion of an entire transmission link at different frequencies can be assessed without additional hardware-based measurement, thereby reducing measurement costs. In addition, the method can measure radio frequency power distortion involving loads in the entire transmission link and reception link, thereby improving the accuracy of compensation parameters.

An embodiment of the present application further provides a scanning and imaging method of a magnetic resonance imaging system. The same content as that of the foregoing embodiments is not repeated herein.

Figure 11:
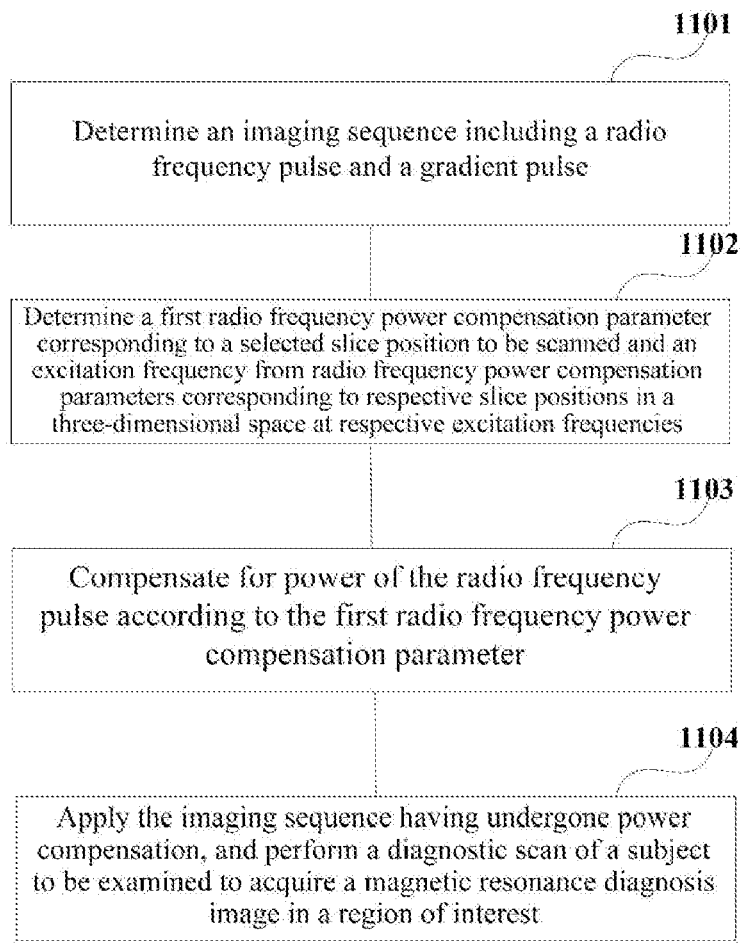
FIG. 11 is a schematic diagram of a scanning and imaging method of a magnetic resonance imaging system according to an embodiment of the present application.

FIG. 11 is a schematic diagram of a scanning and imaging method of a magnetic resonance imaging system according to an embodiment of the present application. As shown in FIG. 11, a scanning and imaging method of a magnetic resonance imaging system includes: 1101, determining an imaging sequence including a radio frequency pulse and a gradient pulse; 1102, determining a first radio frequency power compensation parameter corresponding to a selected slice position to be scanned and an excitation frequency from radio frequency power compensation parameters corresponding to respective slice positions in a three-dimensional space at respective excitation frequencies, wherein the radio frequency power compensation parameters corresponding to the respective slice positions in the three-dimensional space at the respective excitation frequencies are determined by the radio frequency power compensation parameter determining method according to the foregoing embodiment. At step 1103, the method includes compensating for power of the radio frequency pulse according to the first radio frequency power compensation parameter; and at step 1104, the method includes applying the imaging sequence having undergone power compensation, and performing a diagnostic scan of a subject to be examined to acquire a magnetic resonance diagnosis image in a region of interest.

In some embodiments, presetting of diagnostic scan parameters may be performed, including conventional shimming setting and setting of a center frequency parameter scan range (e.g., a slice position and the number of slices), a scan protocol, etc. In addition, the imaging sequence is determined (selected). The imaging sequence refers to a combination of pulses having specific amplitudes, widths, directions, and time sequences and applied when a magnetic resonance imaging scan is performed. The pulses may typically include, for example, a radio frequency pulse and a gradient pulse. The radio frequency pulses may include, for example, radio frequency transmission pulses, radio frequency refocus pulses, inversion recovery pulses, etc. The gradient pulses may include, for example, the aforementioned gradient pulse for layer selection, gradient pulse for phase encoding, gradient pulse for frequency encoding, phase balance pulse for phase balance of proton precession, etc. Typically, a plurality of imaging sequences can be preset in the magnetic resonance imaging system, so that the sequence suitable for clinical detection requirements can be determined (selected). The clinical detection requirements may include, for example, a part to be imaged, an imaging function, an imaging effect, and the like.

In some embodiments, during a pre-scan, frequency adjustment may be performed to determine the Larmor frequency of proton resonance of the current diagnostic scan (a center frequency of the current magnetic resonance examination) on the basis of feedback of magnetic resonance signals at different frequencies, and a radio frequency emission intensity adjustment may be performed to determine radio frequency pulse transmission power of the current diagnostic scan on the basis of feedback of magnetic resonance signals at different radio frequency transmission intensities. For details, reference may be made to the prior art, which are not numerated herein.

In some embodiments, after the radio frequency pulse transmission power T of the current diagnostic scan is determined, a radio frequency power compensation parameter of the radio frequency pulse transmission power of the current diagnostic scan can be further determined. For example, a first radio frequency power compensation parameter corresponding to a selected slice position to be scanned and an excitation frequency is determined from radio frequency power compensation parameters corresponding to respective slice positions in a three-dimensional space at respective excitation frequencies, wherein the radio frequency power compensation parameters corresponding to the respective slice positions in the three-dimensional space at the respective excitation frequencies are determined by the radio frequency power compensation parameter determining method according to the foregoing embodiment. Details will be provided below.

In some embodiments, the Larmor frequency $\omega_2$ at each slice position depends on a position thereof in a z direction and a gradient magnetic field, as shown in equation (1) below:

$$\omega_z = \gamma(B_0 + z \times Gz) \quad (1)$$

where $\gamma$ represents a gyromagnetic ratio, and $B_0$ represents static magnetic field strength.

Since the gradient magnetic field Gz is applied, the Larmor frequency of each slice position in the z direction is different. Thus, after the slice position z1 to be scanned and the imaging sequence are determined, the excitation frequency is determined according to the slice position to be scanned and gradient strength of the gradient pulse. For example, the excitation frequency (equal to the Larmor frequency corresponding to the slice position to be scanned) f1 corresponding to the slice position to be scanned can be determined according to equation (1).

In some embodiments, the radio frequency power compensation parameters corresponding to the respective slice positions in the three-dimensional space at the respective excitation frequencies can be determined by the radio frequency power compensation parameter determining method according to the foregoing embodiment, so that a first radio frequency power compensation parameter P1 corresponding to the selected slice position z1 to be scanned and the excitation frequency f1 can be determined in the radio frequency power compensation parameters corresponding to the respective slice positions in the three-dimensional space at the respective excitation frequencies, and the radio frequency pulse power T can be compensated for according to the first radio frequency power compensation parameter P1. The radio frequency pulse power having undergone compensation is equal to the sum of the original radio frequency pulse power T and a compensation value, and the compensation value is equal to the product of the original radio frequency pulse power T and the first radio frequency power compensation coefficient P1.

For example, the radio frequency power compensation parameters corresponding to the respective slice positions in the three-dimensional space at the respective excitation frequencies may be prestored in a system configuration correction file. After z1 and f1 are determined, P1 corresponding to z1 and f1 may be calculated from the system configuration correction file according to a fit function, and the product of the radio frequency pulse power T and P1 is used as the compensation value, thereby performing predistortion processing on the radio frequency pulse power of the slice position at the excitation frequency.

In some embodiments, after radio frequency power correction is completed and before a diagnostic scan, radio frequency pulse power of a transmitter is re-adjusted to T+T×P1. An imaging sequence having undergone power compensation is applied, and the diagnostic scan of a subject to be examined is performed to acquire a magnetic resonance diagnosis image in a region of interest. That is, precise flip angle (e.g., 90°) excitation can be achieved. Stated differently, radio frequency power is corrected so that a flip angle of spin excitation is accurately set to a predetermined angle (e.g., 90°) to ensure that hydrogen protons of a scanned part are excited into a specified state, thereby ensuring that a high-quantity magnetic resonance diagnosis image is acquired.

It should be noted that FIG. 11 merely schematically illustrates the embodiment of the present application, but the present application is not limited thereto. For example, the order of execution between operations may be suitably adjusted. In addition, some other operations may also be added or some of these operations may be omitted. Those skilled in the art could make appropriate variations according to the above disclosure, rather than being limited by the disclosure of FIG. 11.

The above embodiments merely provide illustrative description of the embodiments of the present application. However, the present application is not limited thereto, and appropriate variations may be made on the basis of the above embodiments. For example, each of the above embodiments may be used independently, or one or more of the above embodiments may be combined.

It can be seen from the above embodiments that a plurality of received magnetic resonance signals corresponding to a plurality of slice positions and a plurality of excitation frequencies are acquired to determine radio frequency power compensation parameters corresponding to respective slice positions in a three-dimensional space at respective excitation frequencies, so as to perform radio frequency power compensation, so that radio frequency power distortion of an entire transmission link at different frequencies can be assessed without additional hardware-based measurement, thereby reducing measurement costs. In addition, the method can measure radio frequency power distortion involving loads in the entire transmission link and reception link, thereby improving the accuracy of compensation parameters.

An embodiment of the present application further provides a phantom of a magnetic resonance imaging system. The phantom includes three elongated cavities orthogonal to each other, and respective centers of the three elongated cavities coincide with an orthogonal intersection. Cross-sectional areas of the three elongated cavities are equal.

In some embodiments, the length of the elongated cavity is greater than or equal to a first threshold, and a cross-sectional area diameter of the elongated cavity is less than or equal to a second threshold.

For example, the elongated cavity is a cylindrical cavity or a rectangular cavity, and phantom resonance liquids contained in the three elongated cavities are the same.

For example, the elongated cavity is a rectangular cavity. A cubic cavity where the three elongated cavities intersect contains a first phantom resonance liquid. A second phantom resonance liquid is contained in positions in the three elongated cavities except the position of the cubic cavity. Longitudinal relaxation times of the first phantom resonance liquid and the second phantom resonance liquid are different.

For implementations of the phantom, reference may be made to the foregoing embodiments, and details will not be described herein again.

An embodiment of the present application further provides a scanning method of a magnetic resonance imaging system. The same content as that of the foregoing embodiments is not repeated herein.

Figure 12:
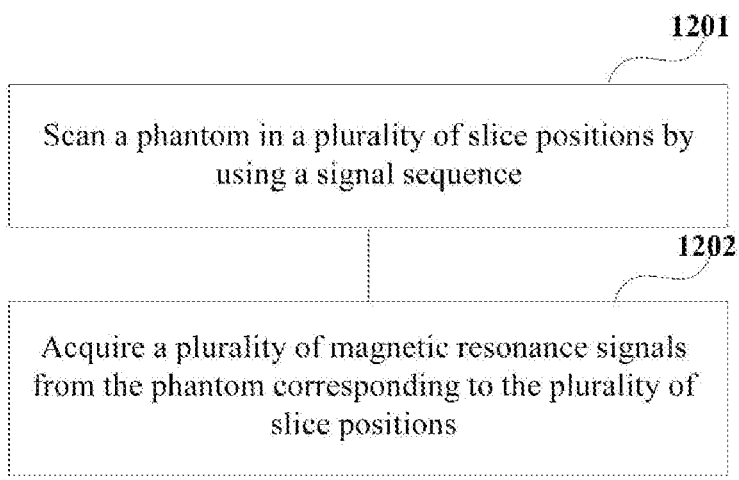
FIG. 12 is a schematic diagram of a scanning method of a magnetic resonance imaging system according to an embodiment of the present application.

FIG. 12 is a schematic diagram of a scanning method of a magnetic resonance imaging system according to an embodiment of the present application. As shown in FIG. 12, the method includes scanning a phantom in a plurality of slice positions by using a scan sequence, the phantom being the phantom of the foregoing embodiment at step 1201. At step 1202, the method includes acquiring a plurality of magnetic resonance signals from the phantom corresponding to the plurality of slice positions.

In some embodiments, when the elongated cavity of the phantom is a cylindrical cavity or a rectangular cavity and phantom resonance liquids contained in the three elongated cavities are the same, in 1201, positioning a center of the phantom at a non-scan center, and performing the first sub-scan of the phantom; and positioning the center of the phantom at a scan center, and performing the second sub-scan of the phantom. In 1202, replacing data of a slice position of a central layer acquired by the second sub-scan with data of the slice position of the central layer acquired by the first sub-scan to acquire the plurality of magnetic resonance signals.

In some embodiments, when the elongated cavity is a rectangular cavity, a cubic cavity where the three elongated cavities intersect contains a first phantom resonance liquid, a second phantom resonance liquid is contained in positions in the three elongated cavities except the position of the cubic cavity, and longitudinal relaxation times of the first phantom resonance liquid and the second phantom resonance liquid are different, in 1201, positioning a center of the phantom at a scan center, and scanning the phantom in the plurality of slice positions, wherein the scan sequence includes a radio frequency excitation pulse and a gradient pulse, and a scan sequence for performing a scan for a slice position of a central layer further includes an inversion recovery pulse applied before the radio frequency excitation pulse.

For implementations of 1201-1202, reference may be made to the foregoing embodiments, and details will not be described herein again.

The above phantom and the above scanning method using the phantom can be used to assess radio frequency power distortion of an entire transmission link at different frequencies without additional hardware-based measurement, thereby reducing measurement costs. In addition, the method can measure radio frequency power distortion involving loads in the entire transmission link and reception link, thereby improving the accuracy of compensation parameters.

An embodiment of the present application further provides a magnetic resonance imaging system. The composition of the magnetic resonance imaging system is shown in FIG. 1, and details will not be described herein again.

In some embodiments, different from those in the foregoing magnetic resonance imaging system in FIG. 1, the controller 130 is further configured to control the scanning unit 110 to use a plurality of scan sequences to scan a phantom in a plurality of slice positions by using a plurality of excitation frequencies, and acquire a plurality of magnetic resonance signals from the phantom corresponding to the plurality of slice positions and the plurality of excitation frequencies; and the processor 150 is further configured to determine, according to the plurality of magnetic resonance signals, radio frequency power compensation parameters corresponding to respective slice positions in a three-dimensional space at respective excitation frequencies.

In some embodiments, the processor 150 is further configured to determine a first radio frequency power compensation parameter corresponding to a selected slice position to be scanned and an excitation frequency from the radio frequency power compensation parameters corresponding to the respective slice positions in the three-dimensional space at respective excitation frequencies, and compensate for power of a radio frequency pulse in an imaging sequence according to the first radio frequency power compensation parameter; and the controller 130 is further configured to control the scanning unit 110 to apply the imaging sequence having undergone power compensation, and perform a diagnostic scan of a subject to be examined to acquire a magnetic resonance diagnosis image in a region of interest.

In some embodiments, the controller 130 is further configured to control the scanning unit 110 to scan a phantom in a plurality of slice positions by using a scan sequence, the phantom being the phantom of the foregoing embodiment; and acquire a plurality of magnetic resonance signals from the phantom corresponding to the plurality of slice positions.

In some embodiments, for implementations of the controller 130 and the processor 150, reference may be made to the radio frequency power compensation parameter determining method or the scanning and imaging method or the scanning method of the foregoing embodiments. The functions of the controller 130 and the processor 150 may be integrated into one chip, or implemented by separate chips, which is not limited in the embodiments of the present application.

In some embodiments, the controller 130 is coupled to the scanning unit 110 to control the scanning unit 110 to scan a phantom to acquire radio frequency power compensation parameters corresponding to respective slice positions in a three-dimensional space at respective excitation frequencies, and additionally, to perform the above diagnostic scan on a subject (e.g., a human body) 16 to be examined.

In some embodiments, the controller 130 and the processor 150 may separately or collectively include a computer processor and a storage medium. The storage medium records a predetermined data processing program to be executed by the computer processor. For example, the storage medium may store a program configured to implement scanning processing (for example, including waveform design/conversion, and the like), image reconstruction, image processing, and the like, may store, for example, a program configured to implement a radio frequency power compensation parameter determining method of the embodiments of the present invention, and in addition, may further store a system configuration correction file storing the above-described radio frequency power compensation parameters corresponding to respective slice positions in a three-dimensional space at respective excitation frequencies. The storage medium may include, for example, a ROM, a floppy disk, a hard disk, an optical disk, a magneto-optical disk, a CD-ROM, or a non-volatile memory card.

It can be seen from the above embodiments that a plurality of received magnetic resonance signals corresponding to a plurality of slice positions and a plurality of excitation frequencies are acquired to determine radio frequency power compensation parameters corresponding to respective slice positions in a three-dimensional space at respective excitation frequencies, so as to perform radio frequency power compensation, so that radio frequency power distortion of an entire transmission link at different frequencies can be assessed without additional hardware-based measurement, thereby reducing measurement costs. In addition, the method can measure radio frequency power distortion involving loads in the entire transmission link and reception link, thereby improving the accuracy of compensation parameters.

Figure 13:
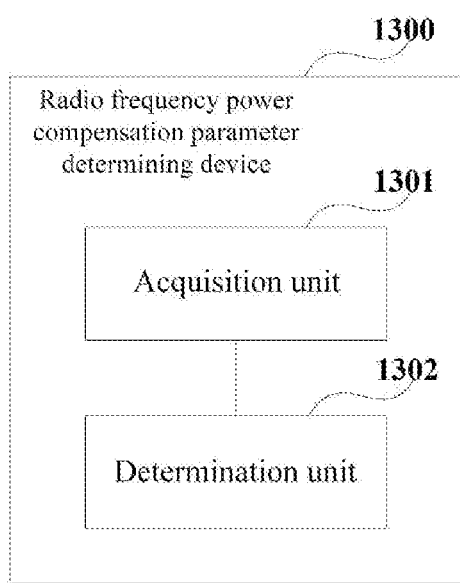
FIG. 13 is a schematic diagram of a radio frequency power compensation parameter determining device according to an embodiment of the present application.

An embodiment of the present application further provides a radio frequency power compensation parameter determining device. FIG. 13 is a schematic diagram of a radio frequency power compensation parameter determining device. As shown in FIG. 13, the device includes:

an acquisition unit 1301, for acquiring a plurality of magnetic resonance signals corresponding to a plurality of slice positions and a plurality of excitation frequencies after a phantom is scanned; and a determination unit 1302, for determining, according to the plurality of magnetic resonance signals, radio frequency power compensation parameters corresponding to respective slice positions in a three-dimensional space at respective excitation frequencies.

In some embodiments, the acquisition unit respectively acquires, for each slice position of the plurality of slice positions, a plurality of magnetic resonance signals corresponding to different excitation frequencies of different scan sequences.

In some embodiments, the determination unit respectively determines square roots of main lobe peaks of the plurality of magnetic resonance signals, performs high-order polynomial fitting of the square roots of the main lobe peaks to acquire a fit function resulting from the fitting, and uses the fit function as the radio frequency power compensation parameters corresponding to the respective slice positions in the three-dimensional space at the respective excitation frequencies.

In some embodiments, the determination unit respectively acquires, for each slice position of the plurality of slice positions, square roots of main lobe peaks of a plurality of magnetic resonance signals corresponding to different excitation frequencies of different scan sequences.

In some embodiments, the device further includes (not shown): a preprocessing unit, for respectively preprocessing the plurality of magnetic resonance signals, the preprocessing including at least eliminating an error caused by at least one of a relaxation rate, an initial phase, polarization, and time offset, wherein the determination unit determines, according to the plurality of preprocessed magnetic resonance signals, the radio frequency power compensation parameters corresponding to the respective slice positions in the three-dimensional space at the respective excitation frequencies.

In some embodiments, for implementations of the acquisition unit 1301 and the determination unit 1302, reference may be made to the foregoing embodiments, and details will not be described herein again.

In some embodiments, the functions of the device 1300 may be integrated into a first processor to implement the radio frequency power compensation parameter determining method described in the foregoing embodiments. That is, the first processor may be configured to: acquire a plurality of magnetic resonance signals corresponding to a plurality of slice positions and a plurality of excitation frequencies after a phantom is scanned; and determine, according to the plurality of magnetic resonance signals, radio frequency power compensation parameters corresponding to respective slice positions in a three-dimensional space at respective excitation frequencies. For specific implementations, reference may be made to the foregoing embodiments, and details will not be described herein again.

An embodiment of the present application further provides a computer-readable program. When the program is executed in a device or an MRI system, the program causes a computer to perform, in the device or the MRI system, the radio frequency power compensation parameter determining method or the scanning and imaging method or the scanning method described in the foregoing embodiments.

An embodiment of the present application further provides a storage medium having a computer-readable program stored thereon. The computer-readable program causes a computer to perform, in a device or an MRI system, the radio frequency power compensation parameter determining method or the scanning and imaging method or the scanning method described in the foregoing embodiments.

The above apparatus and method of the present application can be implemented by hardware, or can be implemented by hardware in combination with software. The present application relates to such a computer-readable program, when executed by a logical component, causes the logical component to implement the foregoing apparatus or constituent part, or causes the logical component to implement various methods or steps as described above. The present application further relates to a storage medium for storing the above program, such as a hard disk, a magnetic disk, an optical disk, a DVD, a flash memory, etc.

The method/apparatus described with reference to the embodiments of the present application may be directly embodied as hardware, a software module executed by a processor, or a combination of the two. For example, one or more of the functional block diagrams and/or one or more combinations of the functional block diagrams shown in the drawings may correspond to either respective software modules or respective hardware modules of a computer program flow. These software modules may respectively correspond to the steps shown in the figures. These hardware modules can be implemented, for example, by firming the software modules using a field-programmable gate array (FPGA).

The software modules may be located in a RAM, a flash memory, a ROM, an EPROM, an EEPROM, a register, a hard disk, a portable storage disk, a CD-ROM, or any storage medium in other forms known in the art. A storage medium may be coupled to a processor, so that the processor can read information from the storage medium and can write information into the storage medium. Alternatively, the storage medium may be a component of the processor. The processor and the storage medium may be located in an ASIC. The software module may be stored in a memory of a mobile terminal, and may also be stored in a memory card that can be inserted into a mobile terminal. For example, if a device (such as a mobile terminal) uses a large-capacity MEGA-SIM card or a large-capacity flash memory device, the software modules can be stored in the MEGA-SIM card or the large-capacity flash memory device.

One or more of the functional blocks and/or one or more combinations of the functional blocks shown in the accompanying drawings may be implemented as a general-purpose processor, a digital signal processor (DSP), an application specific integrated circuit (ASIC), a field-programmable gate array (FPGA) or other programmable logic devices, discrete gate or transistor logic devices, a discrete hardware assembly, or any appropriate combination thereof for implementing the functions described in the present application. The one or more functional blocks and/or the one or more combinations of the functional blocks shown in the accompanying drawings may also be implemented as a combination of computing apparatuses, such as a combination of a DSP and a microprocessor, multiple microprocessors, one or more microprocessors in communication combination with a DSP, or any other such configuration.

The present application is described above with reference to specific implementations. However, it should be clear to those skilled in the art that such description is merely illustrative and is not intended to limit the scope of protection of the present application. Various variations and modifications may be made by those skilled in the art according to the principle of the present application, and these variations and modifications also fall within the scope of the present application.

Additional Points

1. A phantom for a magnetic resonance imaging system, characterized by comprising three elongated cavities orthogonal to each other, wherein respective centers of the three elongated cavities coincide with an orthogonal intersection, and cross-sectional areas of the three elongated cavities are equal.

2. The phantom according to additional note 1, wherein the length of the elongated cavity is greater than or equal to a first threshold, and a cross-sectional area diameter of the elongated cavity is less than or equal to a second threshold.

3. The phantom according to additional note 1 or 2, wherein the elongated cavity is a cylindrical cavity or a rectangular cavity, and phantom resonance liquids contained in the three elongated cavities are the same.

4. The method according to additional note 1 or 2, wherein the elongated cavity is a rectangular cavity, and a cubic cavity where the three elongated cavities intersect contains a first phantom resonance liquid, a second phantom resonance liquid being contained in positions in the three elongated cavities except the position of the cubic cavity, and longitudinal relaxation times of the first phantom resonance liquid and the second phantom resonance liquid being different.

5. A scanning method of a magnetic resonance imaging system, characterized by comprising: scanning a phantom in a plurality of slice positions by using a scan sequence, the phantom being the phantom according to any one of additional notes 1 to 4; and acquiring a plurality of magnetic resonance signals from the phantom corresponding to the plurality of slice positions.

6. The method according to additional note 5, wherein the step of scanning a phantom in a plurality of slice positions comprises:
positioning a center of the phantom at a non-scan center, and performing the first sub-scan of the phantom; and
positioning the center of the phantom at a scan center, and performing the second sub-scan of the phantom.

7. The method according to additional note 6, wherein the step of acquiring a plurality of magnetic resonance signals from the phantom corresponding to the plurality of slice positions comprises: replacing data of a slice position of a central layer acquired by the second sub-scan with data of the slice position of the central layer acquired by the first sub-scan to acquire the plurality of magnetic resonance signals.

8. The method according to additional note 5, wherein the step of scanning a phantom in a plurality of slice positions comprises: positioning a center of the phantom at a scan center, and scanning the phantom in the plurality of slice positions.

9. The method according to additional note 8, wherein the scan sequence comprises a radio frequency excitation pulse and a gradient pulse, and a scan sequence for performing a scan for a slice position of a central layer further comprises an inversion recovery pulse applied before the radio frequency excitation pulse.

10. A magnetic resonance imaging system, comprising: a scanning unit; a controller, configured to control the scanning unit to perform the scanning method according to any one of additional notes 5 to 9.

11. A radio frequency power compensation parameter determining device, characterized by comprising: an acquisition unit, for acquiring a plurality of magnetic resonance signals corresponding to a plurality of slice positions and a plurality of excitation powers after a phantom is scanned; and a determination unit, for determining, according to the plurality of magnetic resonance signals, radio frequency power compensation parameters corresponding to respective slice positions in a three-dimensional space at respective excitation frequencies.

12. The device according to additional note 11, wherein the acquisition unit respectively acquires, for each slice position of the plurality of slice positions, a plurality of magnetic resonance signals corresponding to different excitation frequencies of different scan sequences.

13. The device according to additional note 11, wherein the determination unit respectively determines square roots of main lobe peaks of the plurality of magnetic resonance signals, performs high-order polynomial fitting of the square roots of the main lobe peaks to acquire a fit function resulting from the fitting, and uses the fit function as the radio frequency power compensation parameters corresponding to the respective slice positions in the three-dimensional space at the respective excitation frequencies.

14. The device according to additional note 13, wherein the determination unit respectively acquires, for each slice position of the plurality of slice positions, square roots of main lobe peaks of a plurality of magnetic resonance signals corresponding to different excitation frequencies of different scan sequences.

15. The device according to any one of additional notes 11 to 14, further comprising: a preprocessing unit, for respectively preprocessing the plurality of magnetic resonance signals, the preprocessing comprising at least eliminating an error caused by at least one of a relaxation rate, an initial phase, polarization, and time offset, wherein the determination unit determines, according to the plurality of preprocessed magnetic resonance signals, the radio frequency power compensation parameters corresponding to the respective slice positions in the three-dimensional space at the respective excitation frequencies.

The invention claimed is:

1. A radio frequency power compensation parameter determining method of a magnetic resonance imaging system, characterized by comprising:

using a plurality of scan sequences to scan a phantom in a plurality of slice positions distributed in a three-dimensional space by using a plurality of excitation frequencies;

acquiring a plurality of magnetic resonance signals from the phantom corresponding to the plurality of slice positions; and determining, according to the plurality of magnetic resonance signals, radio frequency power compensation parameters corresponding to respective slice positions in a three-dimensional space at respective excitation frequencies.

2. The method according to claim 1, wherein the step of acquiring a plurality of magnetic resonance signals from the phantom corresponding to the plurality of slice positions and the plurality of excitation frequencies comprises:

for each slice position of the plurality of slice positions, respectively acquiring a plurality of magnetic resonance signals corresponding to different excitation frequencies of different scan sequences using a data acquisition unit.

3. The method according to claim 1, wherein the step of determining, according to the plurality of magnetic resonance signals, radio frequency power compensation parameters corresponding to respective slice positions in a three-dimensional space at respective excitation frequencies comprises:

respectively determining square roots of main lobe peaks of the plurality of magnetic resonance signals using a processor;

performing high-order polynomial fitting of the square roots of the main lobe peaks to acquire a fit function resulting from the fitting using the processor; and using the fit function as the radio frequency power compensation parameters corresponding to the respective slice positions in the three-dimensional space at the respective excitation frequencies using the processor.

4. The method according to claim 3, wherein the step of respectively determining square roots of main lobe peaks of the plurality of magnetic resonance signals comprises: for each slice position of the plurality of slice positions, respectively acquiring square roots of main lobe peaks of a plurality of magnetic resonance signals corresponding to different excitation frequencies of different scan sequences using the processor.

5. The method according to any claim 1, wherein each scan sequence comprises a radio frequency excitation pulse, a first gradient pulse applied along with the radio frequency excitation pulse, and a second gradient pulse applied after the first gradient pulse, and wherein gradient directions of the first gradient pulse and the second gradient pulse are inverse to each other, and the absolute value of gradient strength of the first gradient pulse and the absolute value of gradient strength of the second gradient pulse are equal.

6. The method according to claim 5, wherein the absolute values of the gradient strength of the first gradient pulses or the second gradient pulses in different scan sequences are different.

7. The method according to claim 5, wherein the step of acquiring a plurality of magnetic resonance signals from the phantom corresponding to the plurality of slice positions and the plurality of excitation frequencies comprises:

when the second gradient pulse is applied, acquiring one magnetic resonance signal from the phantom corresponding to one slice position of the plurality of slice positions.

8. The method according to claim 1, further comprising:

respectively preprocessing the plurality of magnetic resonance signals, the preprocessing comprising at least eliminating an error caused by at least one of a relaxation rate, an initial phase, polarization, and time offset using a processor;

and determining, according to the plurality of preprocessed magnetic resonance signals, the radio frequency power compensation parameters corresponding to the respective slice positions in the three-dimensional space at the respective excitation frequencies using the processor.

9. The method according to claim 1, wherein the phantom comprises three elongated cavities orthogonal to each other, and respective centers of the three elongated cavities coincide with an orthogonal intersection, cross-sectional areas of the three elongated cavities being equal.

10. The method according to claim 9, wherein the length of the elongated cavity is greater than or equal to a first threshold, and a cross-sectional area diameter of the elongated cavity is less than or equal to a second threshold.

11. The method according to claim 9, wherein the elongated cavity is a cylindrical cavity or a rectangular cavity, and phantom resonance liquids contained in the three elongated cavities are the same.

12. The method according to claim 9, wherein the elongated cavity is a rectangular cavity, and a cubic cavity where the three elongated cavities intersect contains a first phantom resonance liquid, a second phantom resonance liquid being contained in positions in the three elongated cavities except the position of the cubic cavity, and longitudinal relaxation times of the first phantom resonance liquid and the second phantom resonance liquid being different.

13. The method according to claim 11, wherein the step of scanning the phantom in a plurality of slice positions comprises:

controlling a table to position a center of the phantom at a non-scan center using a controller, and performing the first sub-scan of the phantom using a scanning unit; and controlling the table to position the center of the phantom at a scan center using the controller, and performing the second sub-scan of the phantom using the scanning unit.

14. The method according to claim 13, further comprising: replacing data acquired by the second sub-scan at a central layer with data acquired by the first sub-scan at the central layer to acquire the plurality of magnetic resonance signals using a processor, wherein the central layer is a slice position passing through the orthogonal intersection of the elongated cavities of the phantom.

15. The method according to claim 12, wherein the step of scanning the phantom in a plurality of slice positions comprises:

controlling a table to position a center of the phantom at a scan center using a controller, and scanning the phantom in the plurality of slice positions using a scanning unit.

16. The method according to claim 15, wherein a scan sequence for performing a scan at a central layer further comprises an inversion recovery pulse applied before a radio frequency excitation pulse, wherein the central layer is a slice position passing through the orthogonal intersection of the elongated cavities of the phantom.

17. A scanning and imaging method of a magnetic resonance imaging system, comprising:

determining an imaging sequence comprising a radio frequency pulse and a gradient pulse using a controller;

determining a first radio frequency power compensation parameter corresponding to a slice position to be scanned and an excitation frequency from radio frequency power compensation parameters corresponding to respective slice positions in a three-dimensional space at respective excitation frequencies using a processor, wherein the radio frequency power compensation parameters corresponding to the respective slice positions in the three-dimensional space at the respective excitation frequencies are determined by the method according to claim 1;

compensating for power of the radio frequency pulse according to the first radio frequency power compensation parameter using the processor; and applying the imaging sequence having undergone power compensation using the controller, and performing a diagnostic scan of a subject to be examined to acquire a magnetic resonance diagnosis image in the region of interest using a scanning unit, wherein the phantom is scanned to determine the radio frequency power compensation parameters prior to scanning the subject.

18. The method according to claim 17, wherein the step of determining the first radio frequency power compensation parameter corresponding to the slice position to be scanned and an excitation frequency comprises:

determining the excitation frequency according to the slice position to be scanned and gradient strength of the gradient pulse; and determining the first radio frequency power compensation parameter corresponding to the selected slice position to be scanned and the excitation frequency from the radio frequency power compensation parameters corresponding to the respective slice positions in the three-dimensional space at the respective excitation frequencies.

19. A magnetic resonance imaging system, comprising:

a scanning unit;

a controller, configured to control the scanning unit to use a plurality of scan sequences to scan a phantom in a plurality of slice positions by using a plurality of excitation frequencies, and acquire a plurality of magnetic resonance signals from the phantom corresponding to the plurality of slice positions and the plurality of excitation frequencies; and a processor, configured to determine, according to the plurality of magnetic resonance signals, radio frequency power compensation parameters corresponding to respective slice positions in a three-dimensional space at respective excitation frequencies.

20. The system according to claim 19, wherein the processor is further configured to determine a first radio frequency power compensation parameter corresponding to a slice position to be scanned and an excitation frequency from the radio frequency power compensation parameters corresponding to the respective slice positions in the three-dimensional space at the respective excitation frequencies, and compensate for power of a radio frequency pulse in an imaging sequence according to the first radio frequency power compensation parameter, and the controller is further configured to control the scanning unit to apply the imaging sequence having undergone power compensation, and perform a diagnostic scan of a subject to be examined to acquire a magnetic resonance diagnosis image in a region of interest, wherein the phantom is scanned to determine the radio frequency power compensation parameters prior to scanning the subject.

* * * * *